(12) United States Patent
Maggiore et al.

(10) Patent No.: US 9,950,286 B2
(45) Date of Patent: Apr. 24, 2018

(54) CAPSULE BODY ATTACHMENT

(71) Applicant: Sartorius Stedim Biotech GmbH, Goettingen (DE)

(72) Inventors: Frank Maggiore, Port Jefferson, NY (US); Robert Wright, Centerport, NY (US); Peter Makowenskyj, Kings Park, NY (US); Kevin Walter, East Northport, NY (US); April Thelemann, East Islip, NY (US); Gary Dawson, Hauppauge, NY (US)

(73) Assignee: Sartorius Stedim Biotech GmbH, Goettingen (DE)

( * ) Notice: Subject to any disclaimer, the term of this patent is extended or adjusted under 35 U.S.C. 154(b) by 1109 days.

(21) Appl. No.: 14/059,567

(22) Filed: Oct. 22, 2013

(65) Prior Publication Data

US 2015/0108050 A1  Apr. 23, 2015

(51) Int. Cl.
*B01D 35/30* (2006.01)

(52) U.S. Cl.
CPC .... *B01D 35/303* (2013.01); *B01D 2201/4023* (2013.01); *B01D 2201/52* (2013.01); *B01D 2201/56* (2013.01); *Y10T 29/49947* (2015.01)

(58) Field of Classification Search
CPC .. B01D 35/301; B01D 35/303; B01D 35/306; B01D 2201/305; B01D 2201/4023; B01D 2201/4038; B01D 2201/56
See application file for complete search history.

(56) References Cited

U.S. PATENT DOCUMENTS

| | | | |
|---|---|---|---|
| 6,969,462 B2 * | 11/2005 | Liang ................... | B01D 35/301 137/545 |
| 7,886,610 B2 * | 2/2011 | Gustafson ............. | G01L 9/0089 73/736 |
| 7,905,457 B2 | 3/2011 | Meissner et al. | |
| 8,524,079 B1 * | 9/2013 | Tseng ................... | B01D 35/303 210/232 |

* cited by examiner

*Primary Examiner* — Terry K Cecil
(74) *Attorney, Agent, or Firm* — Gerald E. Hespos; Michael J. Porco; Matthew T. Hespos

(57) ABSTRACT

A filter housing comprising an accommodation space for accommodating a filter is disclosed, wherein the filter housing further comprises at least one connector-like coupling element configured to indirectly or directly mate with at least one mating coupling element of a mating filter housing; and wherein the coupling element is integrally formed on a portion of the filter housing.

20 Claims, 21 Drawing Sheets

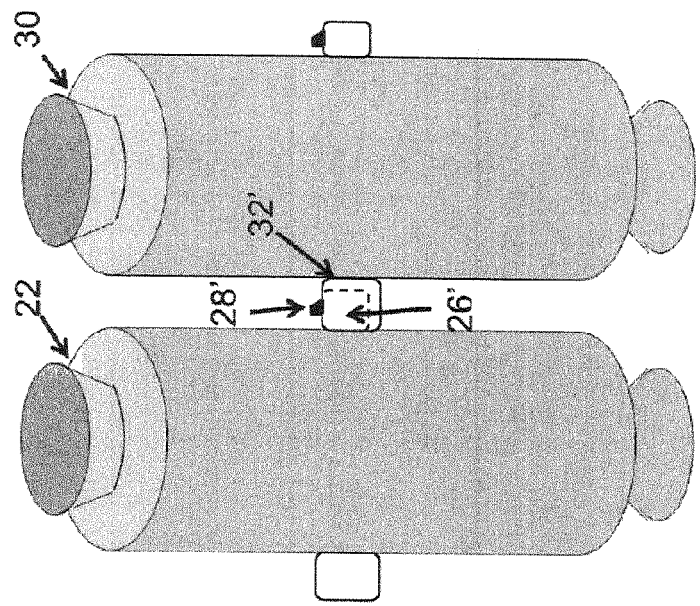
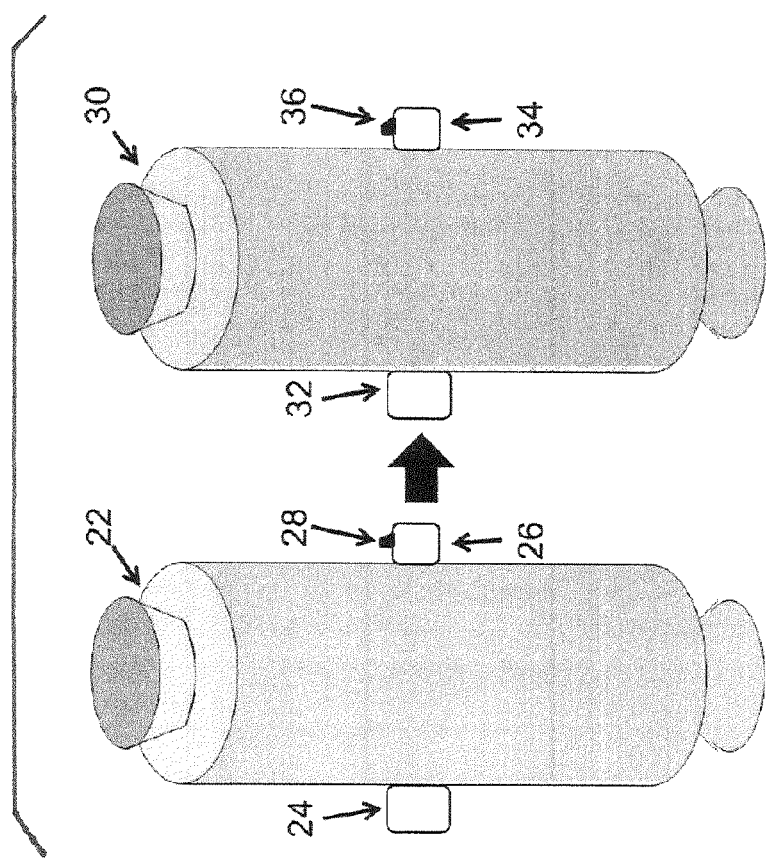
Fig. 2B
Fig. 2A

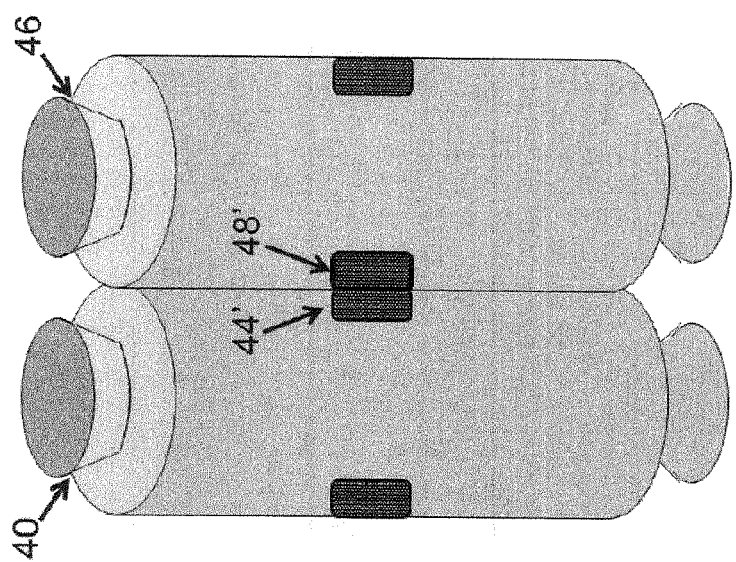
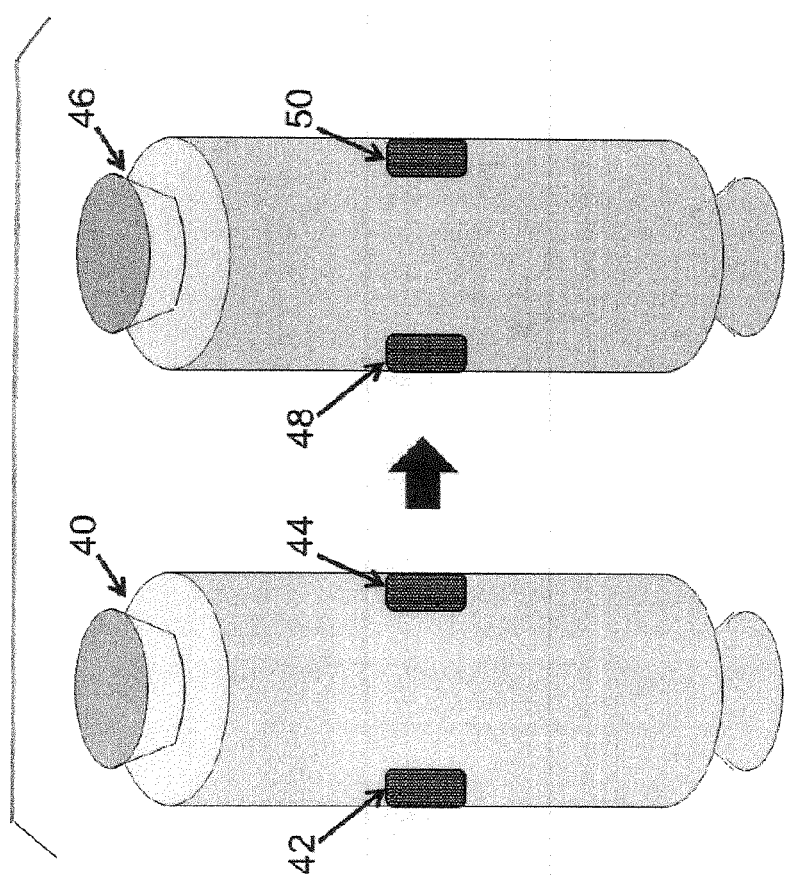
Fig. 3B
Fig. 3A

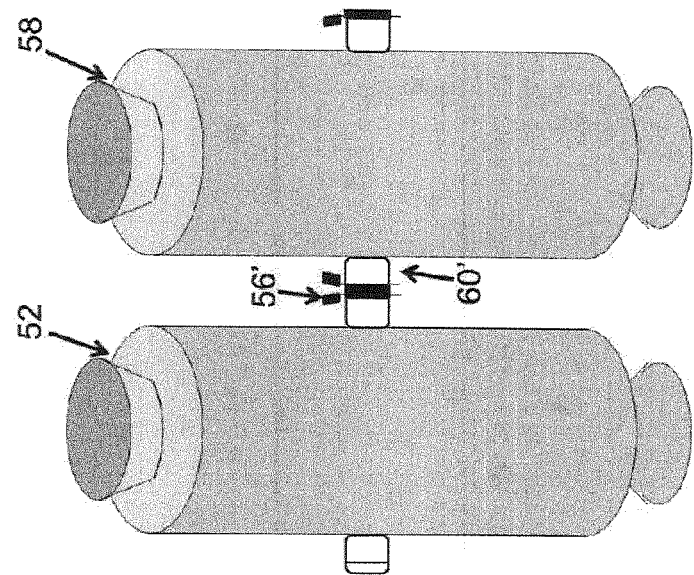
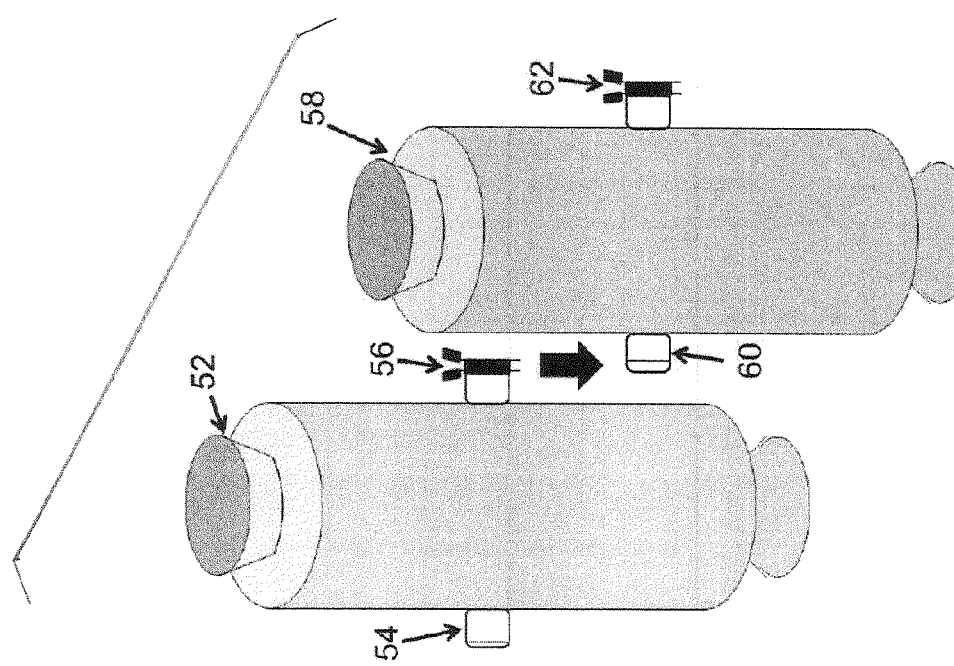

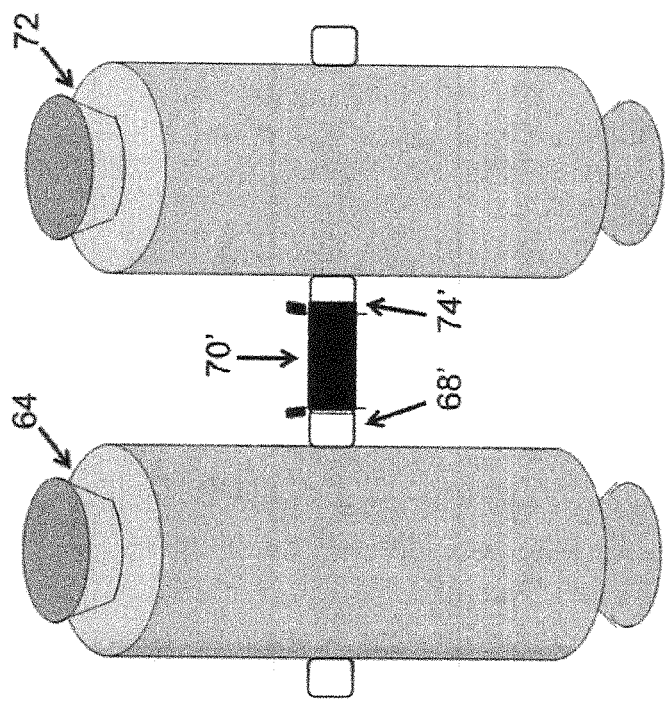
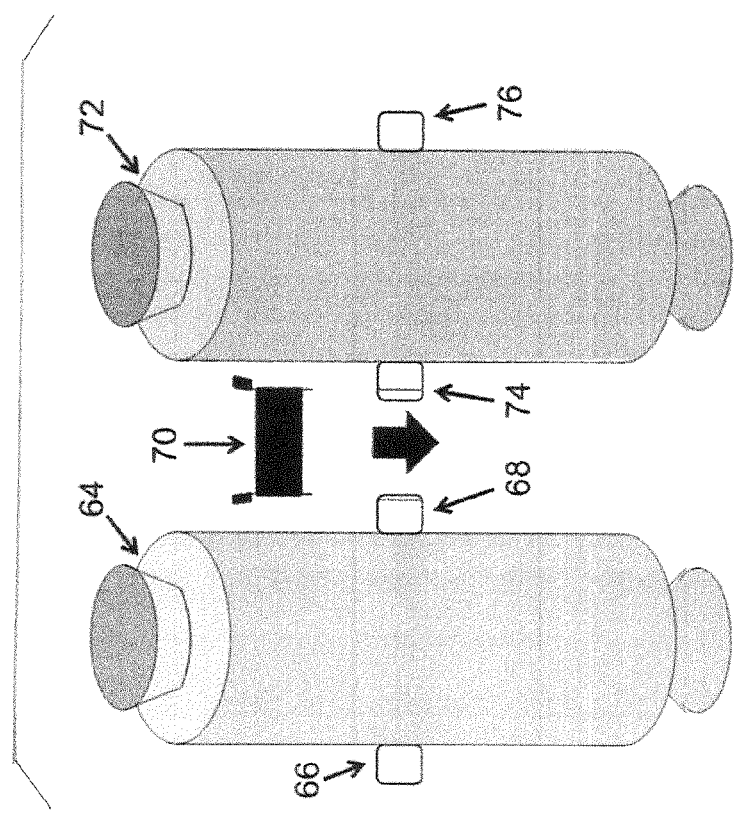

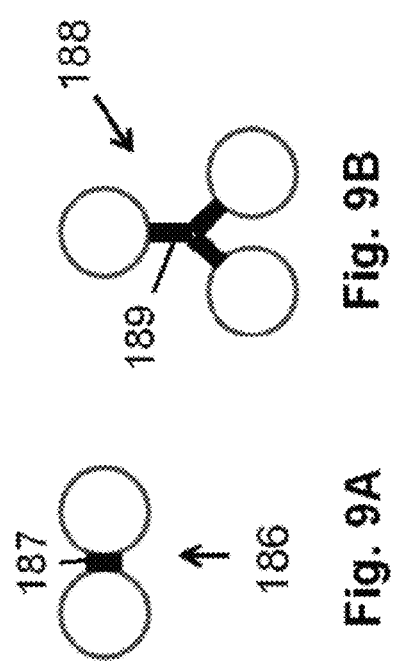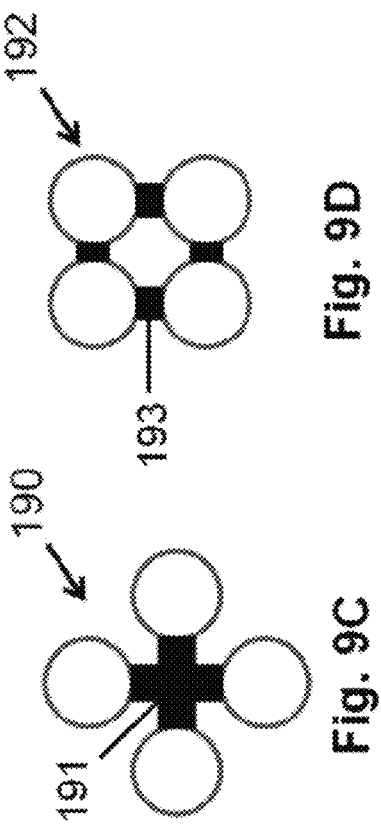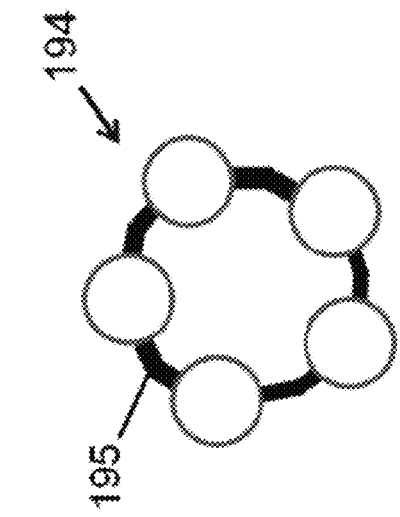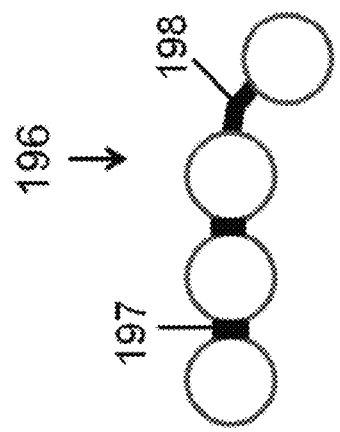

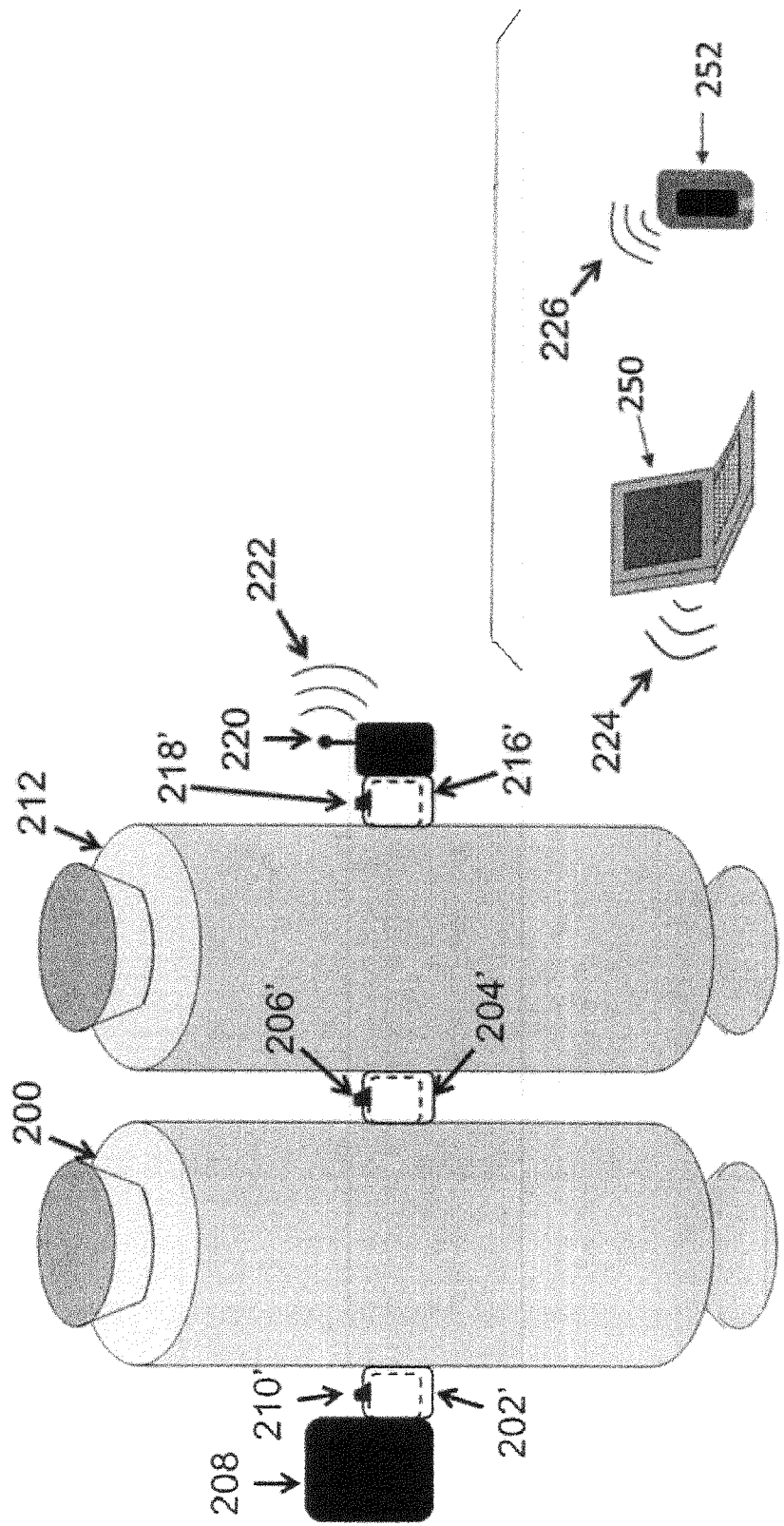

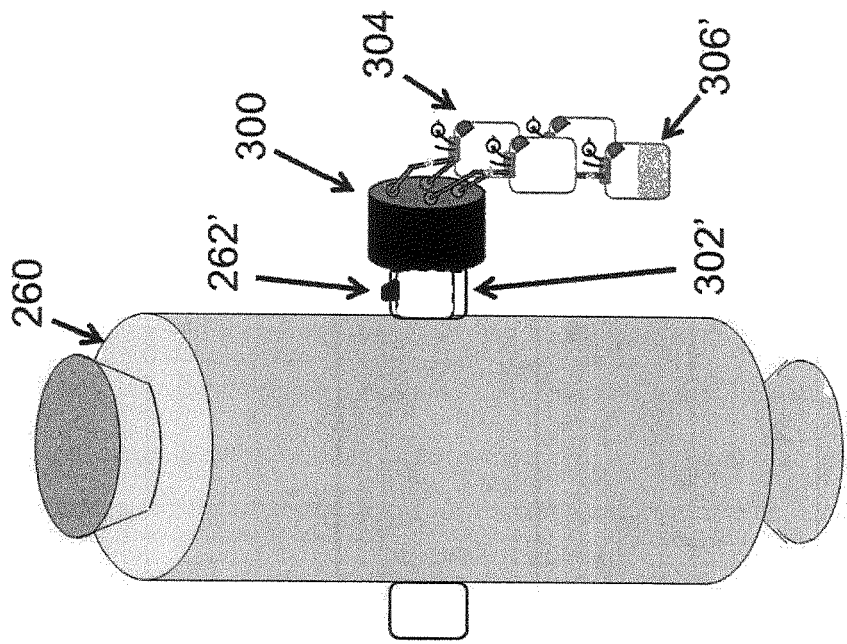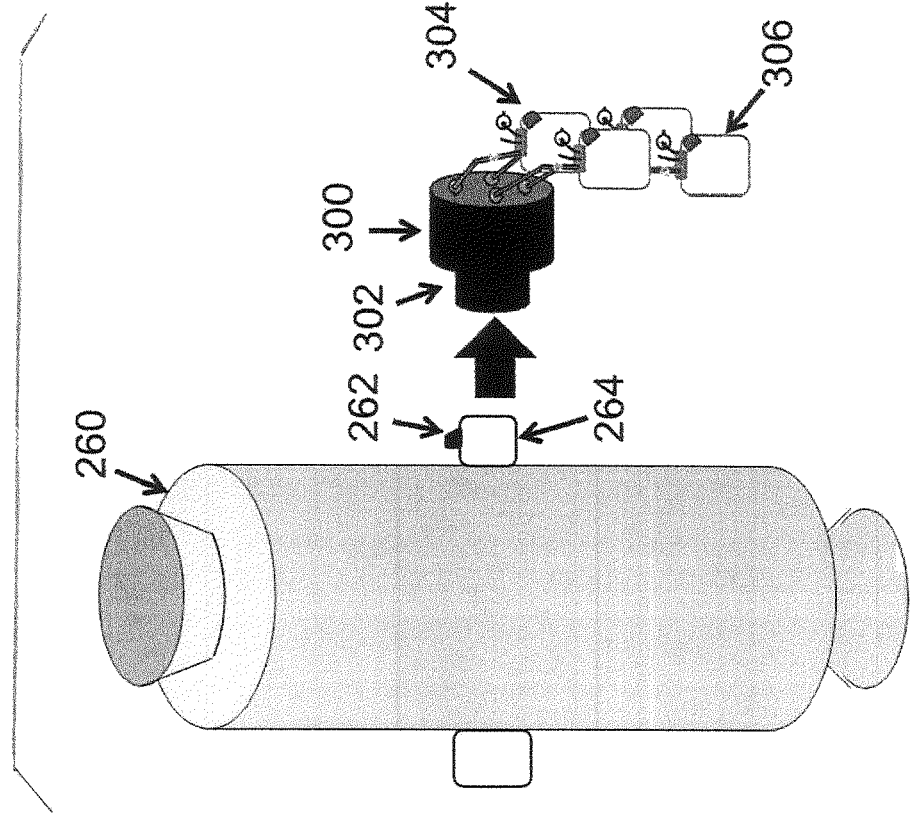

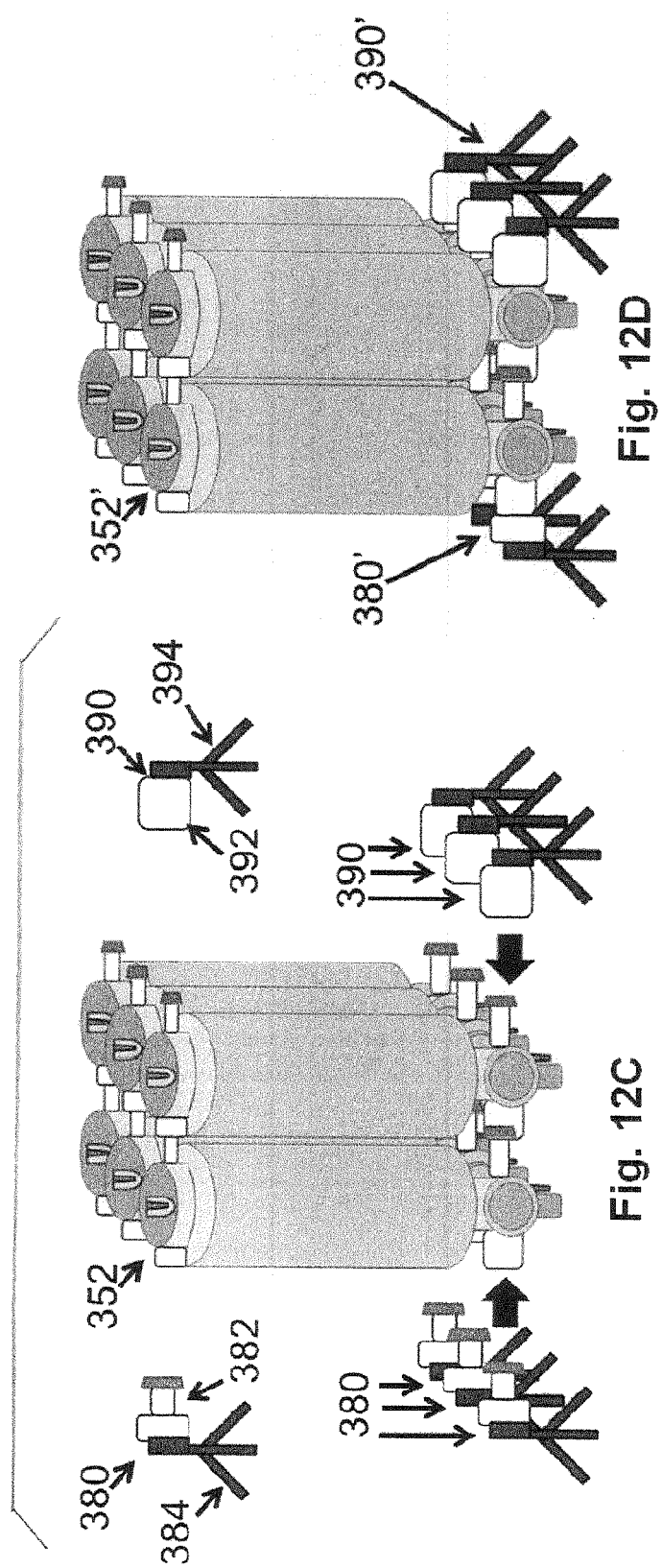

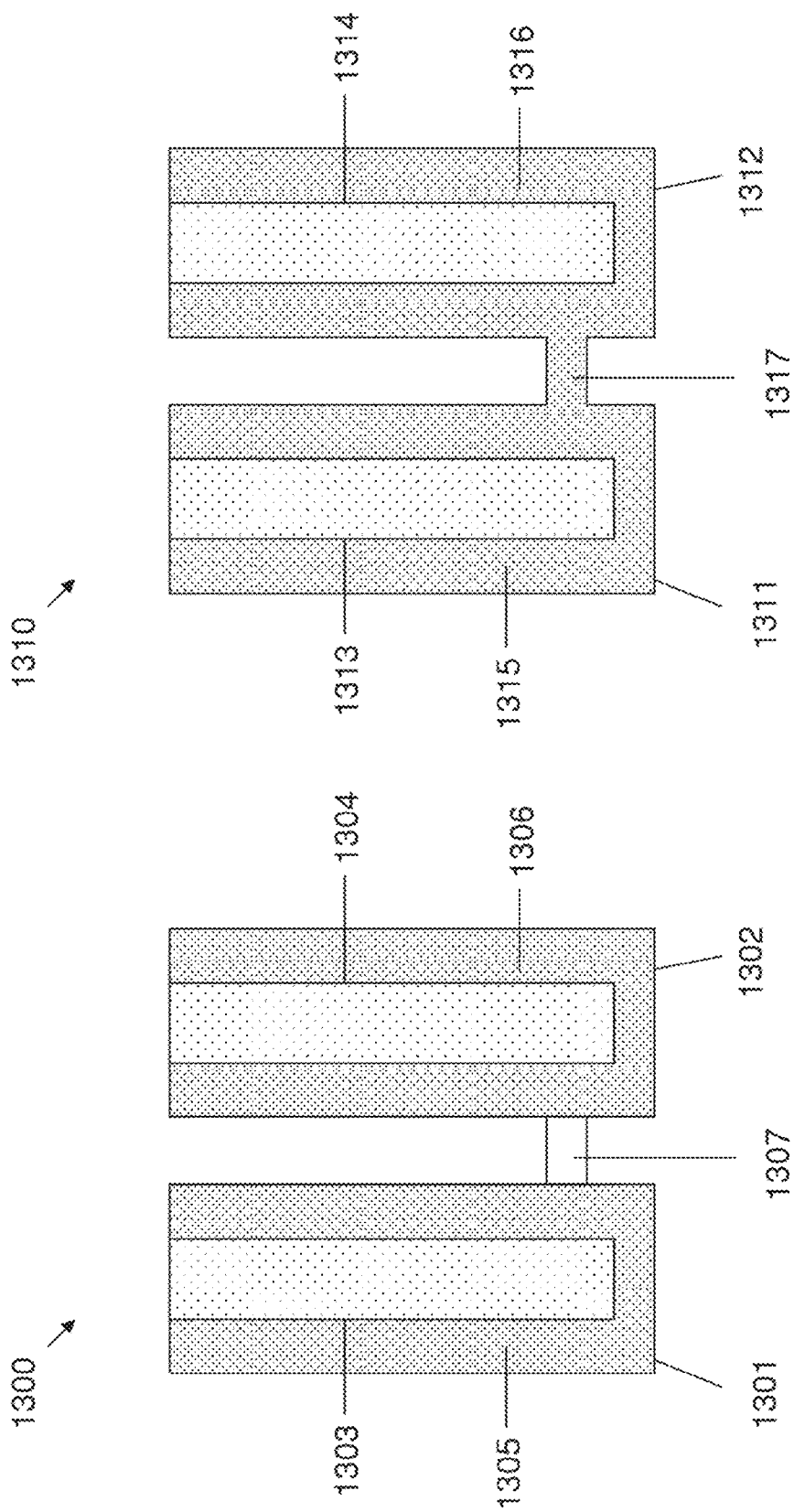

CAPSULE BODY ATTACHMENT

BACKGROUND

1. Field of the Invention

This invention relates to a filter housing which allows for the quick attachment of filter capsules for single-use assemblies used in bag assemblies, transfer sets, or other assemblies.

2. Description of the Related Art

Filter capsules are generally individual single-use filtration devices that are discarded after use. When they are joined to other filter capsules they are usually done so in series with a plurality of pre-filtration filters. With the proliferation of larger sized single-use bag systems containing a bag assembly, a filter train, and aseptic connections, the need for larger filtration area to be connected to the single-use bag systems has increased.

U.S. Pat. No. 7,905,457 B2 discloses interlocking brackets for filter capsules. Embodiments of these interlocking brackets include bracket portions provided separately from the filter capsules having concave surfaces and plugs wherein the concave surfaces are configured to retain a filter capsule when plugs of the brackets are engaged with other brackets by surrounding and holding in place the filter capsules. Further, the brackets are able to interlock with other brackets so as to retain multiple filter capsules in position relative to each other for connecting the filter capsules in series or parallel. The separately provided brackets, however, may be cumbersome or insecure since they are not integrally formed on the filter capsules and must be attached to a filter housing by simultaneously fitting two pieces together at the proper location on the filter housing. Thus, it is an object of the present invention to provide stable retaining of a plurality of filter housings more simply.

SUMMARY OF THE INVENTION

The invention described here includes a filter housing and a method for connecting multiple filter capsules each with a filter housing together to increase the filtration area available and the ease of use in handling such an assembly. The benefit of easily connecting filter housings of filter capsules into place is that doing so allows the operator to handle a series of pre-filters and final sterilizing grade filters as a single unit while reducing the holdup volume over currently available bracket designs which require an inverted filter element. For gamma irradiatable bag assemblies containing multiple filters for increased filtration area handling, a connected assembly makes for a more compact setup while reducing possible tears or breaks in the tubing lines due to excessive handling of multiple tubing lines connected to multiple filters simultaneously, which could otherwise cause leaks.

Aspects of embodiments of the present invention are directed to a filter housing comprising an accommodation space for at least partly accommodating a filter, wherein the filter housing further comprises at least one coupling element configured to indirectly or directly mate with at least one mating coupling element of a mating filter housing; and wherein the coupling element is integrally or unitarily formed on a portion of the filter housing.

In another aspect, the coupling element is at least one of molded and welded on at least one of an end cap, a body, a filter connector, and a label ring of the filter housing.

In another aspect, the coupling element and the mating coupling element are connector-like. Thus, the coupling element and the mating coupling element particularly can achieve a form-closed or form-fitting and/or force-fitting connection, so as to mechanically couple the filter housing with the mating filter housing.

In another aspect, the coupling element comprises a barbed end and the mating coupling element of the mating filter housing comprises a receiving holder for receiving the barbed end.

In another aspect, the coupling element includes an attachment end with a displaceable locking tab configured to at least partly enter a void space of a fitted receiving holder of the mating coupling element of the mating filter housing and lock a connection between the filter housing and the mating filter housing. Preferably, the displaceable locking tab is further configured to be operable to remove the connection between the filter housing and the mating filter housing by detaching the attachment end from the fitted receiving holder.

In another aspect, the coupling element comprises a fastener which is at least one of hook and loop fasteners, mushroom shaped fasteners, woven fasteners, and magnets.

In another aspect, the coupling element comprises a reinforced attachment section comprised of an insertion slot and at least one internal locking tab, wherein the reinforced attachment section is configured to receive an external locking piece insertable into the insertion slot, wherein the external locking piece is held into place with the internal locking tab.

In another aspect, the coupling element comprises an attachment end being resiliently deformable which is configured to attach to a receiving holder of the mating coupling element of the mating filter housing.

In another aspect, the coupling element comprises a receiving holder configured to attach to an interconnection member which is further configured to attach to a mating receiving holder of the mating coupling element of the mating filter housing.

In another aspect, the coupling element comprises a sanitary connector configured to attach to a mating sanitary connector of the mating coupling element of the mating filter housing by means of a gasket between the sanitary connector and the mating sanitary connector; and a sanitary clamp.

In another aspect, the coupling element is further configured to provide an electrical connection for at least one of receiving, transmitting, and carrying at least one of communication, power, and electrical signals.

In another aspect, the coupling element is further configured for attaching at least one external device. Preferably, the external device is a power device that is connected to the filter housing the coupling element, wherein the power device includes at least one of: a battery which is preferably rechargeable, a power cord or other wired connection, a powered communication port, a solar cell, a mechanical power source, an electromechanical power source such as a hand crank, and a wireless power source. Alternatively preferably, the external device includes at least one of: a communications device, a sampling device, a measuring device, a flow meter, a temperature sensor, a pressure driven device, an orientation sensor, a tilt sensor, an accelerometer, a free-fall sensor, an impact sensor, a vibration or acoustic sensor, a weight sensor or other load bearing sensor, a force gauge, a dosimeter, a metal detector, a motion detector, a dynamic surface tension sensor, a pressure sensor, a concentration sensor, a hygrometer, a conductivity sensor, a viscometer, a rheometer, a chemical sensor, a trace gas sensor, a pH sensor, a light sensor, a luminance sensor, a dissolved oxygen sensor, a carbon dioxide sensor, a glucose sensor, a protein concentration sensor, and an assay sensor.

In another aspect, the coupling element provides a fluid connection between the filter housing and the mating filter housing. Preferably, the coupling element is a first aseptic connector assembly with at least one locking tab configured to attach with a slot of a mating aseptic connector assembly of the mating coupling element of the mating filter housing, wherein the first aseptic connector assembly and the mating aseptic connector assembly each further comprise a valve for controlling fluid flow through the aseptic connector assembly; a membrane at an end of the aseptic connector assembly; and a removal tab for removing the membrane. Alternatively preferably, the coupling element allows for sharing of upstream volumes for the connected filter housings. Alternatively preferably, the coupling element allows for a downstream volume of a primary filter, such as a pre-filter, comprising the filter housing to be aseptically connected to the upstream volume of a secondary filter, such as a final filter, comprising the mating filter housing. Alternatively preferably, a pressure gauge with an aseptic connector is aseptically connected to an upstream and/or downstream volume through the coupling element.

In another aspect, the coupling element is configured to attach the filter housing to a holder mechanism comprising at least one of a plurality of legs, tripods, and other holding devices which stably hold the filter housing off of a surface, wherein the coupling element preferably comprises at least one of hinged, articulating, and telescoping legs which can be folded at least one of toward, away, and at an angle to from the external holder and filter housing. Preferably, the holder mechanism is configured with a plurality of at least one of tube holders, holes, notches, and guides for the proper placement and alignment of at least one of tubing, manifolds, cables, electronic equipment, and other accessories utilized for single-use assemblies. Alternatively preferably, at least one of the coupling element and holding mechanism is at least one of molded and color coded to at least one of attach only to a correct coupling element of a correct filter housing and inform an operator visually or audibly of a correct connection between the at least one of the coupling element and the holding mechanism to the correct coupling element.

In another aspect of the present invention, the coupling element comprises at least one of a visual, electronic, and audible confirmation of a connection provided to an operator, a machine, or a monitoring device. Preferably, the confirmation includes at least one of: a plurality of changes including a visual change in color, a change in shape, an alignment of pictographs, symbols or lettering, an LED light, an infrared LED light, an alignment of at least two separated augmented reality marker parts to form a completed whole, a proximity of at least two static augmented reality marker, or a variable augmented reality marker; an electronic change such as a change in an RFID or NFC presentation, and an audible confirmation including at least one of a mechanical click sound when components are mated, a digital or analog sound such as a chime or spoken voice from a speaker, and other sound generated confirmation.

Aspects of embodiments of the present invention are further directed to a filter housing comprising an accommodation space for at least partly accommodating a filter, wherein the filter housing further comprises at least one coupling element configured to indirectly or directly mate with at least one mating coupling element of a mating filter housing; wherein the coupling element is removably formed on a portion of the filter housing; and wherein the coupling element comprises a fastener which is at least one of hook and loop fasteners, mushroom shaped fasteners, woven fasteners, and magnets.

Aspects of embodiments of the present invention are further directed to a filter capsule comprising the filter housing according to the present invention.

Aspects of embodiments of the present invention are further directed to a method of attaching or assembling a plurality of filter housings together comprising the steps of providing a plurality of a filter housings each with an accommodation space for at least partly accommodating a filter, integrally or unitarily forming on a portion of each of the filter housings a coupling element, mating the coupling element of one filter housing of the plurality of filter housings with at least one other filter housing of the plurality of filter housings.

Aspects of embodiments of the present invention are further directed to a method of attaching a plurality of filter housings together comprising the steps of providing a plurality of a filter housings each with an accommodation space for at least partly accommodating a filter, removably forming on a portion of each of the filter housings a coupling element, wherein the coupling element comprises a fastener which is at least one of hook and loop fasteners, mushroom shaped fasteners, woven fasteners, and magnets; and mating the coupling element of one filter housing of the plurality of filter housings with at least one other filter housing of the plurality of filter housings.

These and other objects, features and advantages of the present invention will become more apparent upon reading of the following detailed description of preferred embodiments and accompanying drawings. It should be understood that even though embodiments are separately described, single features thereof may be combined to additional embodiments.

BRIEF DESCRIPTION OF THE DRAWINGS

FIGS. 2A and 2B respectively illustrate exploded and assembled views of an embodiment of filter housings provided with coupling elements comprising a displaceable locking tab and a fitted receiving holder.

FIGS. 3A and 3B respectively illustrate exploded and assembled views of an embodiment of filter housings provided with coupling elements comprising a fastener.

FIGS. 5A and 5B respectively illustrate exploded and assembled views of an embodiment of filter housings provided with coupling elements wherein an attachment end slides into a fitted receiving holder and locks into place.

FIGS. 6A and 6B respectively illustrate exploded and assembled views of an embodiment of filter housings provided with coupling elements wherein an interconnection member slides into receiving holders and locks into place.

FIGS. 9A-9F illustrate embodiments of possible filter capsule attachment configurations comprising filter housings with coupling elements according to the present invention.

FIGS. 10A and 10B respectively illustrate exploded and assembled views of an embodiment of filter housings provided with coupling elements which can provide a power connection, a data connection, and a physical connection for the attachment of multiple devices and FIG. 10C schematically illustrates a computer system that can communicate wirelessly with a communication device associated with the filter housings of FIGS. 10A and 10B.

FIGS. 11A and 11B respectively illustrate exploded and assembled views of an embodiment of a filter housing provided with coupling elements utilizing an automated sampling mechanism external device.

FIGS. 13A-13C are schematic views of possible filter capsule assemblies according to the present invention.

DETAILED DESCRIPTION OF THE PREFERRED EMBODIMENTS

Particular embodiments of the present invention are shown in the figures and are described below. It is to be understood that single features described in the following embodiments may be combined with features of other embodiments as appropriate.

According to an embodiment of the invention, a filter housing comprising an accommodation space for at least partly accommodating a filter further comprising at least one coupling element configured to indirectly or directly mate with at least one mating coupling element of a mating filter housing, wherein the coupling element is integrally or unitarily formed on a portion of the filter housing is provided. In this way, filter capsules comprising such filter housings can be mechanically connected to each other by means of the respective coupling elements. These bracketless mechanical connections between coupling element, whether comprised of direct connections between coupling elements or indirect connections through the use of one or more separate external connectors, may be sufficient on their own to support or mechanically and/or fluidically interconnect a filter capsule assembly comprised of a plurality of filter capsules at least a part of each comprising a filter housing according to an aspect of the present invention particularly without requiring the further use of a frame, holding member(s) or the like. Thus, it may be easier to physically handle and/or assemble such a filter capsule assembly by hand or with a tool or machine. Further, connections between the coupling elements may fix filter housings and thus filter capsules in particular arrangements as needed, wherein the arrangements may be presterilized or sterilized as an assembled device. In some embodiments, connections between coupling elements may be permanent, thereby permanently fixing filter housings relative to each other in a particular arrangement. In other embodiments, connections between coupling elements may be removable or releasable, thereby allowing for repositioning and/or fixing of filter housings relative to each other in multiple possible configurations, as needed. The coupling element(s) may engage with other coupling element(s) or with separate external connector(s) e.g. by means of latches. The latches may provide permanent or removable connections between the coupling elements. In addition, the coupling element(s) may also provide substantially fluid-tight connection(s) which allow the sharing of for example upstream volume between filter housings.

Figure 1B:
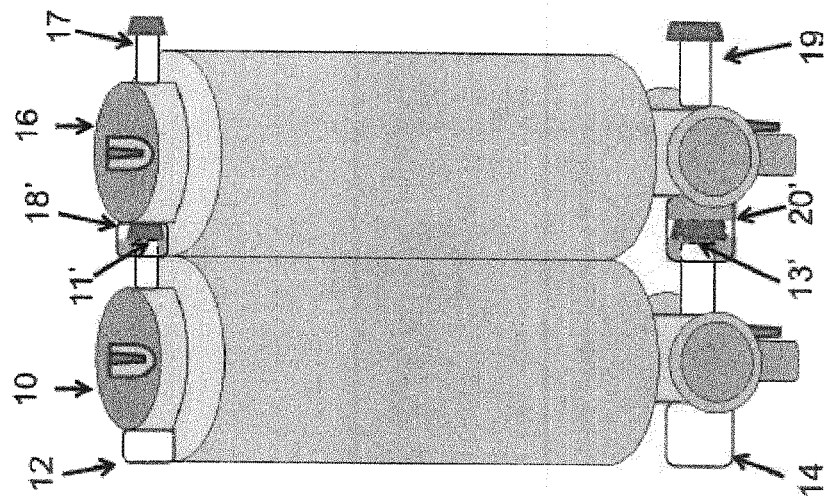
FIGS. 1A and 1B respectively illustrate exploded and assembled views of an embodiment of filter housings provided with coupling elements comprising a barbed end and a receiving holder.
Figure 1A:
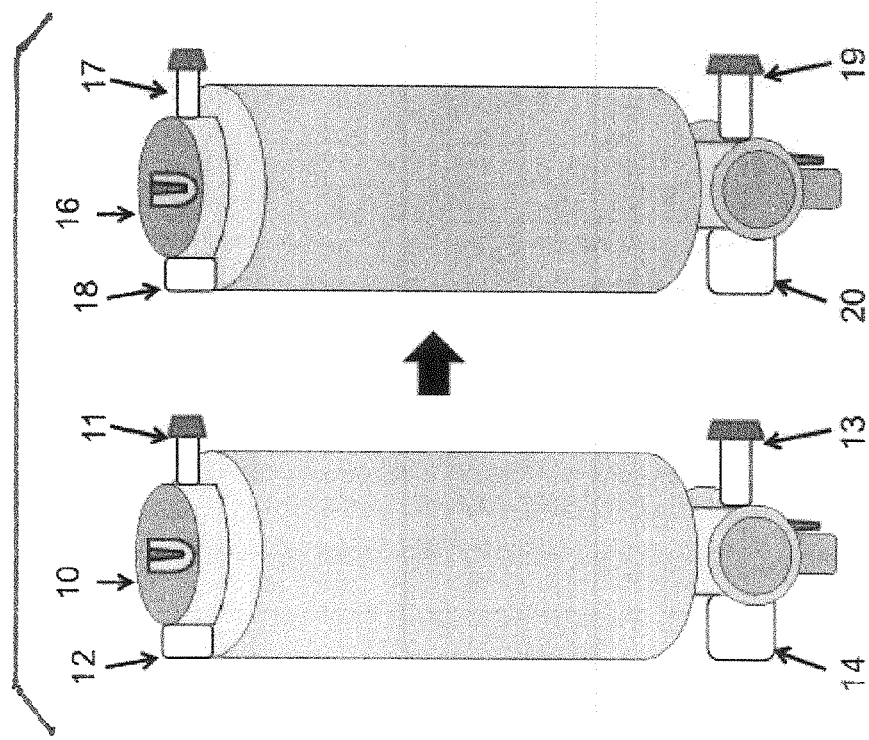

FIG. 1A is a view of a filter housing according to a particular embodiment of the present invention. In this embodiment, a filter housing 10 may comprise coupling elements comprising a barbed end 11 and a receiving holder 12 integrally or unitarily molded into or to (particularly a top end cap of) the filter housing 10 and a barbed end 13 and a receiving holder 14 integrally or unitarily molded into or to (particularly a bottom end cap of) the filter housing 10. A mating filter housing 16 also may comprise substantially corresponding coupling elements comprising a barbed end 17 and a receiving holder 18 integrally or unitarily molded into or to (particularly a top end cap of) the filter housing 16 and a barbed end 19 and a receiving holder 20 integrally or unitarily molded into or to (particularly a bottom end cap of) the mating filter housing 16. Alternatively, the barbed ends 11, 13, 17, 19 and the receiving holders 12, 14, 18, 20 may be integrally or unitarily molded or welded into or to a body, filter connectors, or a label ring of the filter housings 10 and the mating filter housing 16. The barbed ends 11, 13 of the filter housing 10 may be mated with the receiving holders 18, 20 of the mating filter housing or the receiving holder 12, 14 of the filter housing 10 may be mated with the barbed ends 17, 19 of the mating filter housing 16.

In this embodiment, the filter housing 10 is to be connected to the mating filter housing 16 by bringing the barbed ends 11, 13 of filter housing 10 at least partly into receiving holders 18, 20 of the mating filter housing 16 until the connection is securely held in place. FIG. 1B is a view of the filter housing 10 and the mating filter housing 16 attached together by the coupling element(s). The barbed ends 11', 13' are securely held in place or locked with the receiving holders 18', 20' which hold the filter housing 10 and the mating filter housing 16 together with a mechanical connection, thereby fixing the positions of the filter housings relative to each other. In other words, the filter housing 10 is directly mechanically connected or latched to the mating filter housing 16, so as to form an assembly which particularly can be manipulated as a unit. The mechanical connection between the two filter housings can be confirmed to the operator by an audible click sound as the two components are mated. Multiple filter capsules may be added to this assembly in either direction by means of respective coupling element(s). In addition, separate external connectors which may comprise barbed ends and receiving holders substantially similar to those of the filter housing 10 and the mating filter housing 16 may be added to the barbed ends 11, 13, 17, 19 and/or the receiving holders 12, 14, 18, 20 to alter the direction and/or placement of the filter housings in the attached assembly. Accordingly, part or all of the filter capsules comprising the filter housings may be connected to a manifold or assembly and sterilized as an assembled device.

FIG. 2A is a view of a filter housing according to another particular embodiment of the present invention. A filter housing 22 may comprise one or more coupling elements comprising an attachment end 26 with at least one displaceable locking tab 28 and a fitted receiving holder 24 with at least one void or recess for at least partly accommodating the corresponding displaceable locking tab. A mating filter housing 30 similarly may comprise one or more coupling elements comprising an attachment end 34 with at least one displaceable locking tab 36 and a fitted receiving holder 32 with at least one void or recess for at least partly accommodating the respective displaceable locking tab. The attachment ends 26, 34 and the receiving holders 24, 32 may be integrally or unitarily molded or to into end caps, a body, filter connectors, and/or a label rings of the filter housings 22 and/or the mating filter housing 30.

In this embodiment, the filter housing 22 is to be connected to the mating filter housing 30 by bringing the attachment end 26 of the filter housing 22 into the receiving holder 32 of the mating filter housing 30 until the displaceable locking tab 28 is oriented to at least partly enter the sized void space of the fitted receiving holder 32 and the displaceable locking tab 28 locks into place with a mechanical connection, thereby fixing the positions of the filter housings relative to each other. FIG. 2B is a view of the filter housing 22 and the mating filter housing 30 attached together by the coupling elements. The attachment end 26' is locked into place with the receiving holder 32' by the displaceable locking tab 28' which holds the filter housing 22 and the mating filter housing 30 together. Unlike the configuration of FIG. 1, in this embodiment the displaceable locking tab 28 may also substantially fix the relative rotational orientation of the connected filter housings 22, 30 about the axis of the connection between the receiving holder 32' and the attachment end 26'. This connection can also be easily released by displacing the displaceable locking tab 28' and detaching the receiving holder 32' of filter housing 22 from attachment end 26' of filter housing 30. The displaceable locking tab 28' may be displaced for this purpose e.g. by hand or with the use of a tool or machine. The mechanical connection between the two filter housings can be confirmed to the operator by a visual confirmation of a color coded locking tab through the receiving holder as the two components are mated. Multiple filter housings may be added to this assembly in either direction and/or configuration. In addition, separate external connectors which comprise attachment ends, displaceable locking tabs, and receiving holders substantially similar to the attachment ends 26, 34, the displaceable locking tabs 28, 36 and receiving holders 24, 32 of the filter housings 22 and the mating filter housing 30 may be removably attached to the attachment ends 26, 34 and/or the receiving holders 24, 32 to alter the direction and placement of the filter housings in the attached assembly. Accordingly, all of the filter capsules comprising the filter housings may be connected to a manifold or assembly and sterilized as an assembled device.

FIG. 3A is a view of a filter housing according to another particular embodiment of the present invention. A filter housing 40 may comprise one or more coupling elements comprising one or more fasteners 42, 44. A mating filter housing 46 similarly may comprise one or more coupling elements comprising one or more fasteners 48, 50. The fasteners 42, 44, 48, 50 may comprise hook and loop fasteners (for example Velcro®), woven fasteners, mushroom shaped fasteners (for example Dual Lock® or Duotec®), magnets, other types of fasteners, or a combination thereof. Fasteners 42, 44, 48, 50 may be attached to end caps, a body, filter connectors, or a label ring of the filter housing 40 and the mating filter housing 46. The fasteners 42, 44, 48, 50 may be (particularly integrally or unitarily) attached to the filter housing by thermal and/or ultrasonic welding, molding into place on the filter housing, adhesives (particularly adhesive that do not migrate through the polypropylene body of the filter housing), or attaching to a secondary component which is attached or attachable to the body of the filter housing.

In this embodiment, the filter housing 40 is to be connected to the mating filter housing 46 by bringing the fastener 44 from the filter housing 40 together with the fastener 48 from the mating filter housing 46 until the filter housings are held in place and/or mechanically latched or locked by the fasteners. FIG. 3B is a view of the filter housing 40 and the mating filter housing 46 which are attached together by the coupling elements. Fastener 44' is to be attached to fastener 48' which together hold filter housings 40, 46 together with a mechanical connection, thereby fixing the positions of the filter housings relative to each other. The filter housing connection may be easily released by displacing the filter housings 40, 46 apart, releasing the hold of fasteners 44', 48'. Multiple filter capsules can be added to this assembly in either direction and/or configuration. In addition, separate external connecters which comprise fasteners substantially similar to the fasteners 42, 44, 48, 50 of the filter housings 40, 46 may be removably attached to fasteners 42, 44, 48, 50 to alter the direction and placement of the filter housings in the attached assembly. Accordingly, all of the filter capsules comprising the filter housings can be connected to a manifold of assembly and sterilized as an assembled device.

Figure 4B:
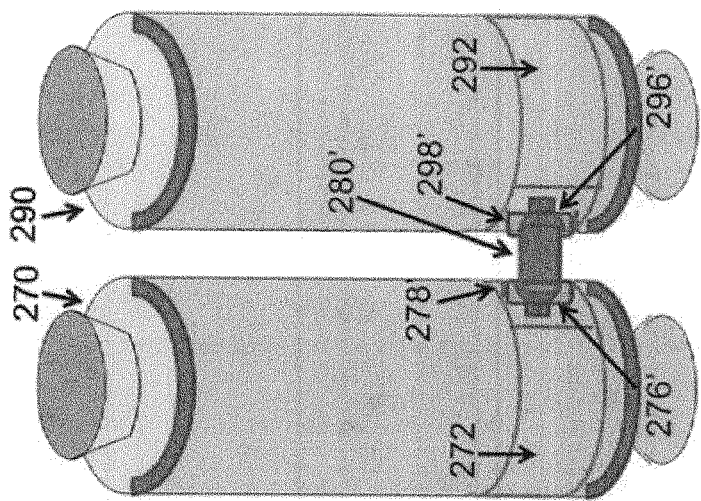
FIGS. 4A and 4B respectively illustrate exploded and assembled views of an embodiment of filter housings provided with coupling elements on a label ring attached to the filter housing provided with an external locking piece which can be inserted and locked into place.
Figure 4A:
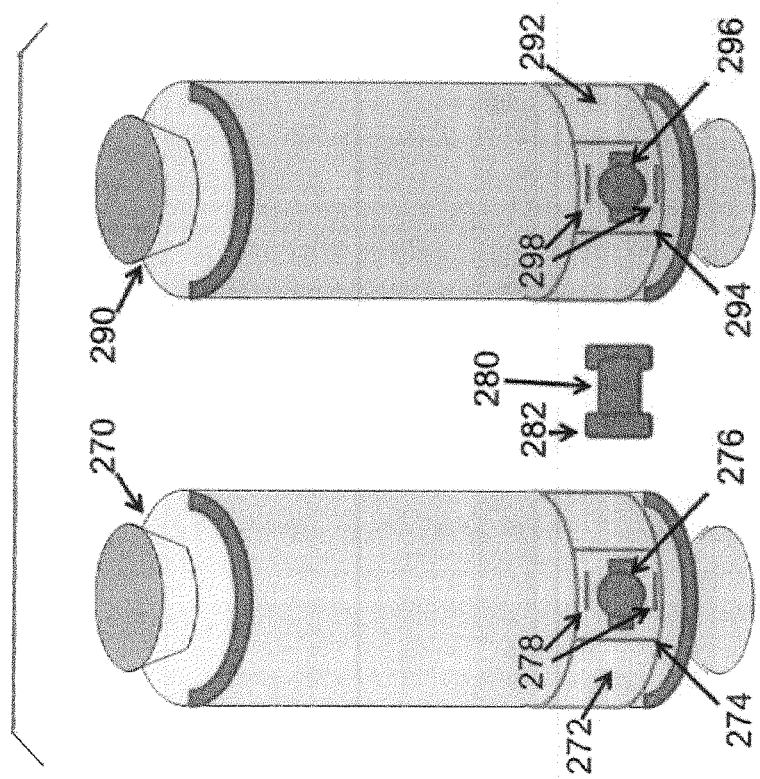

FIG. 4A is a view of a filter housing according to another particular embodiment of the present invention. A filter housing 270 may comprise one or more coupling elements comprising at least one label ring 272 which may provide information on the specific filter or filter capsule, particularly printed information such as part number, lot number, bar codes, testing specifications, or the like. Alternatively or additionally, the label ring 272 may comprise one or more RFID transponders making accessible or providing information on the specific filter or filter capsule. The label ring 272 may comprise one or more coupling elements comprising at least one (particularly reinforced) attachment section 274 comprising an insertion slot 276 and at least one internal locking tab 278. A mating filter housing 290 similarly also may comprise at least one label ring 292. The label ring 292 may comprise a (particularly reinforced) attachment section 294 comprising an insertion slot 296 and at least one internal locking tab 298. An external locking piece 280 can be at least partly inserted into the respective insertion slots 276, 296 of the label rings 272, 292 and for example twisted so that external locking piece ends 282 lock into place into the internal locking tabs 278, 298. The insertion slots 276, 296 may alternatively be integrally or unitarily formed (particularly molded) into or to end caps, a body, and/or filter connectors of the filter housing 270 and/or the mating filter housing 290.

In this embodiment, the label ring 272 of the filter housing 270 specifically is locked with the external locking piece 280' and held in place by the internal locking tab 278' of the filter housing 270, as shown in FIG. 4B. The label ring 292 of the mating filter housing 290 specifically is locked into place with the external locking piece 280' and held in place by the internal locking tabs 298'. In this way, the coupling elements provide the filter housings with a mechanical connection or latching, thereby fixing the positions of the filter housings relative to each other. The connection may be easily released by for example relatively twisting or displacing the external locking piece 280' from the locking tabs 278', 298' and removing the external locking piece 280' from the insertion slots 276', 296' and displacing the filter housing 270 and the mating filter housing 290 apart. Multiple filter capsules can be added to this assembly in either direction and/or configuration depending on the number of insertion slots available on the label ring(s). The label rings specifically may continue to move along the body of the filter capsules or have a groove which they can lock into place for added stability. Accordingly, all of the filter capsules can be connected to a manifold or assembly and/or presterilized or sterilized as an assembled device.

FIG. 5A shows a filter housing according to another particular embodiment of the present invention. A filter housing 52 may comprise at least one coupling element comprising an attachment end or portion 56 which may be resiliently deformable and a fitted receiving holder 54 with a slot for at least partly accommodating the attachment end. A mating filter housing 58 may at least one comprise coupling element comprising an attachment end 62 which may be resiliently deformable and a fitted receiving holder 60 containing a slot for at least partly accommodating the attachment end. The attachment ends 56, 62 and the receiving holders 54, 60 may be formed on (particularly molded into or to) end caps, a body, filter connectors, and/or a label ring of the filter housings 52, 58. Alternatively to molding, the attachment ends 56, 62 and the receiving holders 54, 60 may be welded onto the exterior of the housing components or removably attachable to the filter housings. As an example, the attachments ends may comprise a resiliently deformable plastic which is deformed during connection with a receiving holder and which, after at least partly being accommodated by the receiving holder, at least partly returns to its original shape, thereby securely holding the attachment end with the receiving holder. As a further example, the attachment ends may also comprise tabs which are resiliently displaceable for releasing the attachment end from the receiving holder.

In this embodiment, the filter housing 52 is connected or mechanically latched to the mating filter housing 58 specifically by sliding the attachment end 56 of the filter housing 52 into the receiving holder 60 of the mating filter housing 58 until the attachment end 56 locks into place with the receiving holder 60, as shown in FIG. 5B. The attachment end 56' is locked into place with the receiving holder 60' which hold the filter housing 52 and the mating filter housing 58 together with a mechanical connection, thereby fixing the positions of the filter housings relative to each other. In this example, at least one locking tab is further provided. The locking tab fixes the orientation of the connected filter housings 52, 58. The connection can also be easily released by depressing the locking tab on the attachment end 56' inward (e.g. by hand or with a tool or machine) and displacing the filter housings apart. Multiple filter housings could be added to this assembly in either direction and/or configuration. In addition, separate external connectors which may comprise attachment ends and receiving holders substantially similar to the attachment ends 56, 62 and the receiving holders 54, 60 of the filter housing 52 and the mating filter housing 58 may be removably attached to the attachment end and/or the receiving holders to alter the direction and placement of the filter capsules comprising the filter housings in the attached assembly. Accordingly, all of the filter capsules can be connected to a manifold or assembly and sterilized as an assembled device.

FIG. 6A is a view of a filter housing according to another particular embodiment of the present invention. A filter housing 64 may comprise one or more coupling elements comprising a plurality of receiving holders 66, 68. A mating filter housing 72 also may comprise one or more coupling elements comprising a plurality of receiving holders 74, 76. An interconnection member 70 comprising at least one locking tab on each end slides at least partly onto into the receiving holders 68, 74 until the locking tabs into place. All of the receiving holders 66, 68, 74, 76 can be molded into end caps, a body, filter connectors, and/or a label ring of the filter housings. Alternatively the receiving holders 66, 68, 74, 76 can be welded or glued onto the exterior of the filter housings or removably attachable to the filter housings.

In this embodiment, the filter housing 64 is to be connected to the mating filter housing 72 by sliding the interconnection member 70 piece at least partly into the receiving holders 68, 74 until the locking tabs from the interconnection member 70 lock into place, as shown in FIG. 6B. The fitted receiving holders 68', 74' are locked into place with the interconnection member 70' by the locking tabs which hold the filter housings 64, 72 together with a mechanical connection, thereby fixing the positions of the filter housings relative to each other. The locking tabs may also fix the rotational orientation of the filter housings 64 and the mating filter housing 72 relative to each other. The connection may also be easily released by displacing the locking tab on the interconnection member 70' e.g. substantially inward (particularly by hand or with a tool or machine) and displacing the filter housings respectively apart from the interconnection member 70'. Multiple filter capsules can be added to this assembly in either direction. In addition, one or more interconnection members 70 (which may have a plurality of different shapes) and/or one or more separate moving bridge connectors with a latch and/or swivel may be removably attached to the fitted receiving holders 66, 68, 74, 76 to alter the direction and/or placement of the filter housings in the attached assembly. Accordingly, all of the filter capsules comprising the filter housings can be connected to a manifold or assembly and particularly sterilized as an assembled device.

Figure 7B:
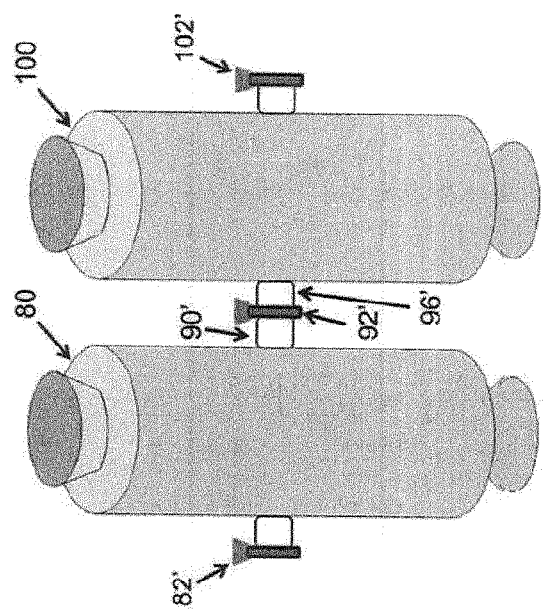
FIGS. 7A and 7B respectively illustrate exploded and assembled views of an embodiment of filter housings provided with coupling elements comprising a sanitary connector.
Figure 7A:
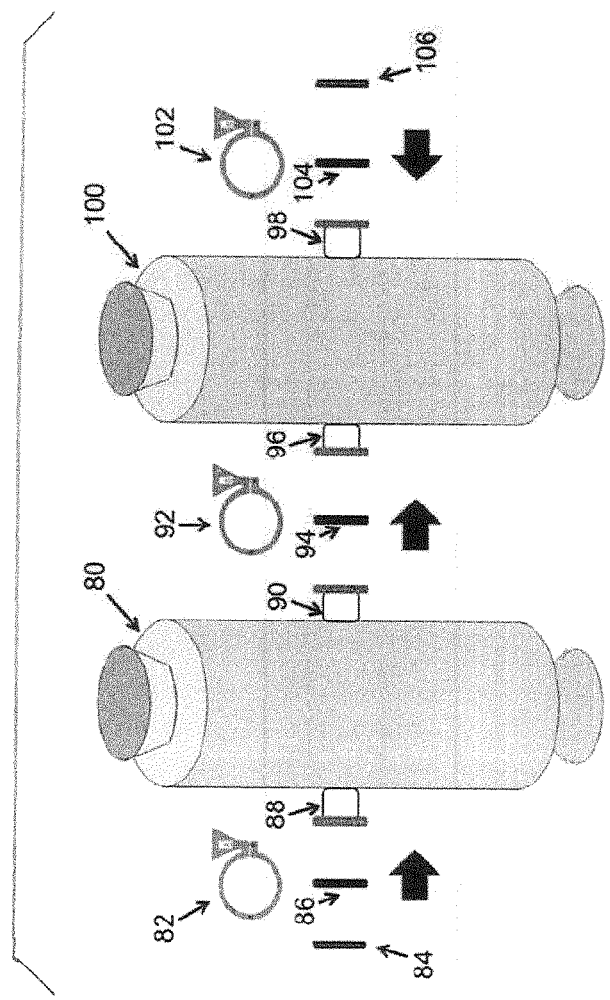

FIG. 7A is a view of a filter housing according to another particular embodiment of the present invention. A filter housing 80 may comprise one or more coupling elements comprising a plurality of sanitary connectors 88, 90. A mating filter housing 100 also may comprise one or more coupling elements comprising a plurality of sanitary connectors 96, 98. The (particularly all of the) sanitary connectors 88, 90, 96, 98 can be integrally or unitarily formed with (particularly molded into or to) the end cap(s), the body, the filter connector(s), and/or at least one label ring of the filter housing(s). Alternatively to molding, the sanitary connectors 88, 90, 96, 98 can be welded or glued onto the exterior of the filter housings or removably attachable to the filter housings. The sanitary connectors 88, 90, 96, 98 can be either sealed from the upstream housing volume or open to the upstream housing volume. An open housing volume connection would allow the filter capsules 80, 100 to share the upstream volume of the fluid being filtered.

In this embodiment the filter housing 80 is connected to the mating filter housing 100 by inserting a sanitary gasket 94 between the sanitary connectors 90, 96 and locking them into place using a sanitary clamp 92. In case the filter housings are to share upstream volume, the sanitary connectors 88, 90, 96, 98 may also be provided with at least one seal which is or may be broken upon attachment of the coupling elements to minimize the possibility of filtrate contamination during the process of connecting the filter housings. The open sanitary connectors 88, 98 can be sealed using a sanitary cap 84, 106 and a sanitary gasket 86, 104, and locked into place with their respective sanitary clamps 82, 102, as shown in FIG. 7B. The sanitary connectors 90', 96' are or may be locked into place with the sanitary clamp 92' and a sanitary gasket (not shown) with a mechanical connection, thereby fixing the positions of the filter housings relative to each other. The connection can be easily released by removing the sanitary clamp 92' from the sanitary connectors 90', 96' and displacing the filter housing 80 and the mating filter housing 100 apart. Multiple filter capsules can be added to this assembly in either direction and/or configuration. All of the filter capsules comprising the filter housings can be connected to a manifold or assembly and sterilized as an assembled device. If the filter capsules are connected sharing an upstream volume, then they can be integrity tested as a multi-round housing.

Figure 8B:
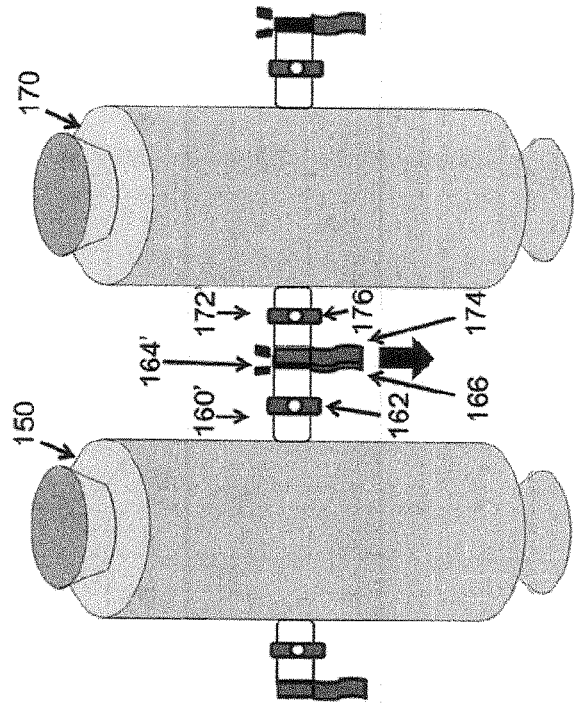
FIG. 8B shows the filter housings of FIG. 8A assembled but with the valves thereof closed and FIG. 8C shows the filter housings of FIG. 8B with the valves open.
Figure 8A:
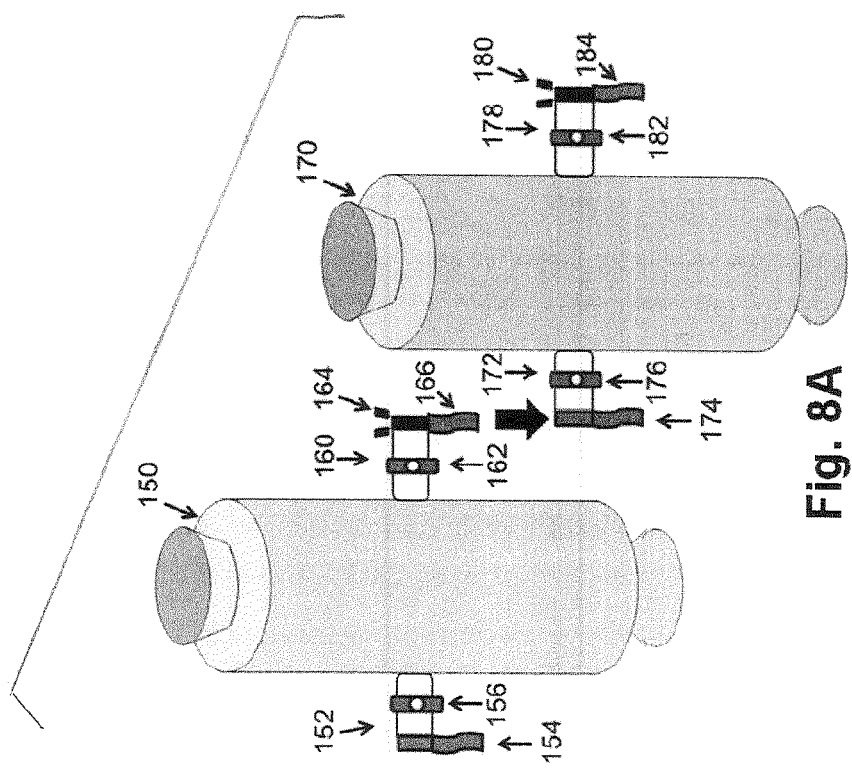
FIG. 8A illustrate an exploded view of an embodiment of filter housings provided with coupling elements comprising an aseptic connector assembly.

FIG. 8A is a view of a filter housing according to another particular embodiment of the present invention. A filter housing 150 may comprise one or more coupling elements comprising a plurality of aseptic connector assemblies 152, 160. The filter housing 150 may comprise at least one male (particularly aseptic) connector assembly 160, preferably comprising at least one locking tab 164, and/or a female (particularly aseptic) connector receiving assembly 152, preferably comprising at least one slot for at least partly accommodating the locking tab. The (particularly aseptic) connector assemblies 152, 160 for the filter housing 150 (particularly each) may comprise a valve 156, 162 for controlling fluid flow, for example to the upstream housing, and a membrane with a removal tab 154, 166 for removing the membrane. A mating filter housing 170 may comprise one or more coupling elements comprising a male aseptic connector assembly 178, preferably comprising at least one locking tab 180, and a female aseptic connector receiving assembly 172, preferably comprising at least one slot for at least partly accommodating the locking tab 180. The aseptic connector assemblies 172, 178 for the mating filter housing 170 (particularly each) may comprise a valve 176, 182 for controlling fluid flow, for example to the upstream housing, and a membrane with a removal tab 174, 184 for removing the membrane. The (particularly aseptic) connector assemblies 152, 160, 172, 178 may be open to the upstream housing volume which would allow the filter housings 150, 170 to share the upstream volume of the fluid being filtered. The (aseptic) connector assemblies 152, 160, 172, 178 can be molded into end caps, a body, and/or filter connectors of the filter housings 150, 170. The (aseptic) connector assemblies 152, 160, 172, 178 can be fixed to (particularly welded onto) the exterior of the filter housings 150, 170 or removably attachable to the filter housings 150, 170. In case the filter housings are to share upstream volume, the (aseptic) connector assemblies 152, 160, 172, 178 may also be provided with a seal which is broken upon attachment of the coupling elements to minimize the possibility of filtrate contamination during the process of connecting the filter housings.

Figure 8C:
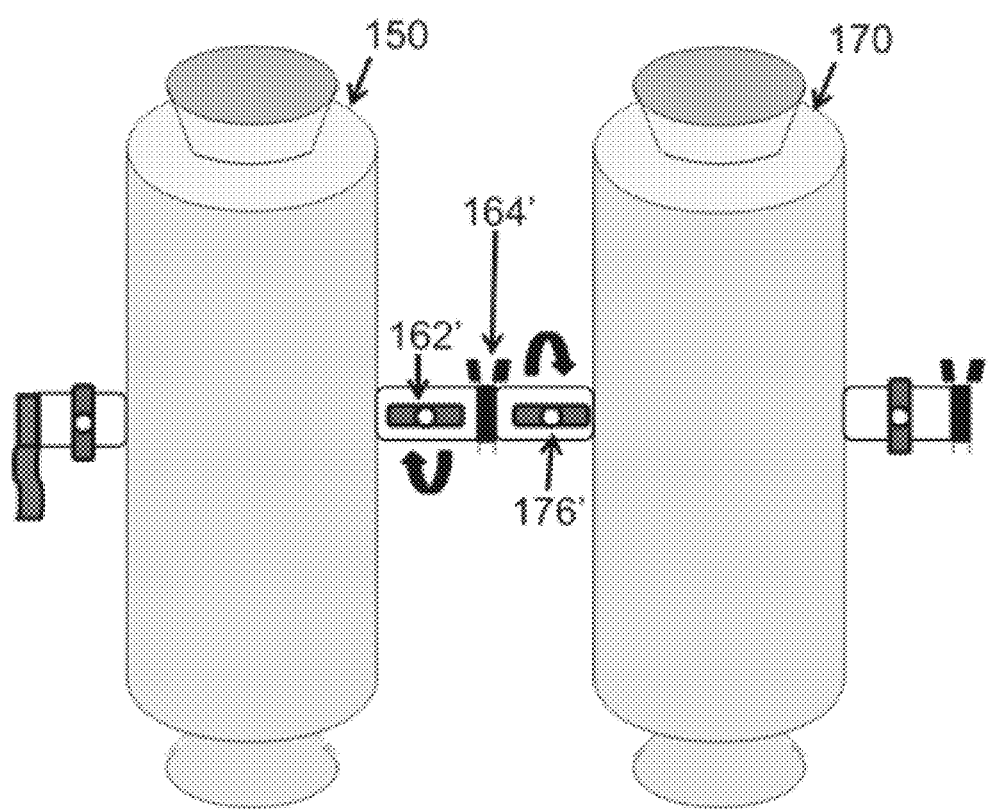

In this embodiment, the filter housing 150 is to be connected to the mating filter housing 170 by at least partly inserting the male (particularly aseptic) connector assembly 160 at least partly into the female (particularly aseptic) connector assembly 172 and locking them into place, as shown in FIG. 8B. In an example, the aseptic connector assemblies 160', 172' are locked into place with the locking tabs 164' with a mechanical connection, thereby fixing the positions of the filter housing relative to each other. The membranes in the aseptic connectors particularly are removed by removing the removal tabs 166, 174, for example by pulling the removal tabs 166, 174 downward e.g. by hand or with a tool or machine, in preparation for fluid flow between the capsules. FIG. 8C is a view of filter housings 150, 170 which are attached together by the aseptic connector assemblies and have the valves 162', 176' opened to allow for fluid flow through the aseptic connector assemblies. The connection can also be aseptically disconnected by closing the valves 162', 176' and displacing the filter housing 150 and the mating filter housing 170 relatively apart. In an example, the locking tabs 164' may be depressed before the aseptic connector assemblies of filter housings can be disconnected. Multiple filter capsules may be added to this assembly in either direction. In addition an external mechanical element, such as a pressure gauge, can be aseptically connected to the filter housing through the aseptic connector assemblies. All of the filter housings may be connected to a manifold or assembly and sterilized as an assembled device. If the filter capsules comprising the filter housings are connected sharing an upstream volume, then they may be integrity tested as a multi-round housing.

FIGS. 9A-F are views of embodiments of filter housing attachment connection configurations or filter capsule assemblies according to various embodiments of the present invention. FIG. 9A is a view of two filter housings 186 attached in a row configuration using a substantially straight attachment 187 connection configuration. This configuration may comprise one or more coupling elements which are directly connected and/or one or more coupling elements which are indirectly connected by at least one separate external connector. FIG. 9B is a view of three filter housings 188 attached in a branch configuration using a substantially 'Y'-shaped attachment 189 connection configuration. This configuration may comprise one or more coupling elements which are directly connected and/or one or more coupling elements which are indirectly connected by at least one separate external connector. FIG. 9C is a view of four filter housings 190 attached in a substantially grid-like configuration using a cross attachment 191 connection configuration. This configuration may comprise one or more coupling elements which are directly connected and/or one or more coupling elements which are indirectly connected by at least one separate external connector. FIG. 9D is a view of four filter housings 192 attached in a matrix configuration using substantially straight attachment 193 connection configurations. These configurations may comprise one or more coupling elements which are directly connected and/or one or more coupling elements which are indirectly connected by at least one separate external connector. FIG. 9E is a view of five filter housings 194 attached in a closed loop configuration using a bent attachment 195 connection configuration. Geometrically, this configuration may be substantially circular or elliptical. This configuration may comprise one or more coupling elements which are directly connected and/or one or more coupling elements which are indirectly connected by at least one separate external connector. FIG. 9F is a view of four filter housings 196 attached in a hybrid configuration using both substantially straight 197 and bent 198 attachment connection configurations. This configuration may comprise one or more coupling elements which are directly connected and/or one or more coupling elements which are indirectly connected by at least one separate external connector.

The present invention is not limited to these example configurations. As the person skilled in the art would recognize, there are many possible combinations of types of configurations and arrangements of a plurality of filter housings and capsules comprising many possible combinations of coupling elements which are directly connected and/or coupling elements which are indirectly connected by at least one external connector. The coupling elements can be molded or color coded to fit only into the correct filter housing type such as by filter family type, if the filter is gamma irradiatable or non-gamma irradiatable, or if the filter is a pre-filter or final filter. This molding or color coding can inform the operator visually or through the direct connection of parts the correct elements to connect to one another. Further, the housing filters may be any suitable combination of housing filters according to the claims. In these configurations, the coupling elements may provide mechanical connections between filter housings which are able to support the filter capsule assembly without the need for example for a separately provided frame or the like. In this way, the filter capsule assemblies can be more quickly assembled and more easily handled by hand or with a tool or machine. Further, all of the filter housings connected in the filter capsule assembly may be sterilized as an assembled device.

Figure 10A:
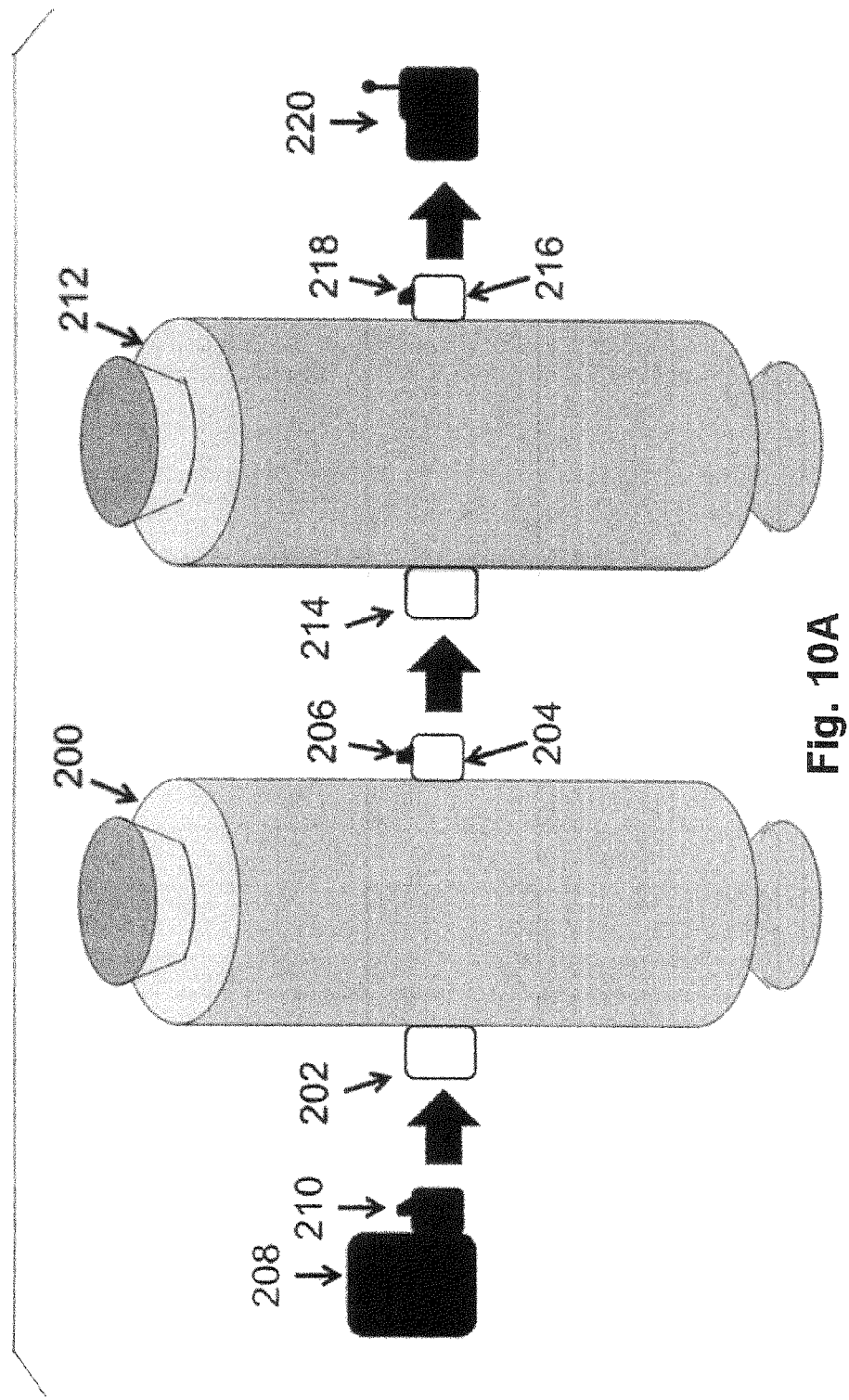

FIG. 10A is a view of a filter housing in accordance with another particular embodiment of the present invention. A filter housing 200 comprises one or more coupling elements comprising an attachment end 204 with a displaceable locking tab 206 and a receiving holder 202 with a void for at least partly accommodating a displaceable locking tab. A mating filter housing 212 similarly comprises at least one coupling element comprising an attachment end 216 with a displaceable locking tab 218 and a receiving holder 214 with a void for at least partly accommodating a displaceable locking tab. The attachment ends 204, 216 and the receiving holders 202, 218 can be molded into end caps, a body, filter connectors, or a label ring of the filter housings. Alternatively, the attachment ends 204, 216 and the receiving holders 202, 218 can be integrally or unitarily provided on (particularly welded onto) the exterior of the filter housings 200, 212 or removably attachable to the filter housing(s). The attachment ends 204, 216 may be substantially similar to attachment end 26 with the displaceable locking tab 28 of the embodiment shown in FIG. 2. The receiving holders 202, 218 may be substantially similar to receiving holder 32 of the embodiment shown in FIG. 2. Alternatively, a fluid-proof connection, such as a National Electrical Manufacturers Association (NEMA) waterproof connection, utilizing a data and/or power connection with a screw lock and fluidproof (specifically waterproof) cover could be utilized.

In this embodiment, the filter housing 200 is connected to the mating filter housing 212 by bringing the attachment end 204 of the filter housing 200 at least partly into receiving holder 214 of the mating filter housing 212 until the displaceable locking tab 206 is oriented to at least partly enter the void space of the receiving holder 214 and the locking tab 206 locks into place with a mechanical connection, thereby fixing the positions of the filter housings relative to each other. The connection between the attachment end 204 and the receiving holder 214 also may include a connection between a power cable and a data cable (not shown).

The power and/or data cable connections can occur as a single connection (such as a USB data/power connection) or as a plurality of data and/or power connections for numerous device attachments with separate power and/or data cable lines. A power source for the filter capsule assembly comprises an external power source 208, preferably a rechargeable battery, which has an attachment end containing a displaceable locking tab 210. This power source is permanently or releasably connected or connectable to filter housing 200 by bringing the attachment end 210 of the power source 208 into receiving holder 202 of filter housing 200 until the displaceable locking tab 210 is oriented to at least partly enter the void space of the receiving holder 202 and the displaceable locking tab 210 specifically locks into place with a mechanical connection, thereby fixing the positions of the filter housing and the power source relative to each other. The internal power and/or data cable may be aligned internally (not shown) to complete this connection. An external communication device 220 may be permanently or releasably connected to filter housing 212 by bringing the receiving holder of the external communication device 220 into the attachment end 216 of filter housing 212 until the displaceable locking tab 218 is oriented to at least partly enter the void space of the fitted receiving holder and the locking tab 218 locks into place with a mechanical connection, thereby fixing the positions of the filter housing and the communication device relative to each other. The internal power and data cable may be aligned internally (not shown) to complete this connection.

FIG. 10B is a view of the two filter housing 200 and the mating filter housing 212 which are attached together. The attachment end 204' is locked into place with the receiving holder by the displaceable locking tab 206' which holds the filter housing 200 and the mating filter housing 212 together. The power source 208 is or may be locked into place with the receiving holder 202' by the displaceable locking tab 210' and the external communication device 220 is locked into place with the attachment end 216' by the displaceable locking tab 218'. The filter housing and device connections may also be easily released by displacing the displaceable locking tabs 210', 206', 218', for example downward by hand or with a tool or machine, and displacing the filter housing 200 and the mating filter housing 212 or the external devices 208, 220 apart. The power source 208 can provide power to one or more sensors and/or devices internal to or unitary/integral with the filter housings and/or to devices connected externally including the attached external communication device 220. The data generated from multiple sensors and/or devices of or internal to the filter housing(s) may be transmitted via the data cable connection and/or may be transmitted to external devices with a wireless signal 222 such as Bluetooth, Wi-Fi, Wireless USB, or the like via the external communication device 220.

FIG. 10C is a view of a computer system 250 which may receive the wireless data signal 222 from the external communication device 220 and a mobile device 252 which may receive the wireless data signal 222 from the external communication device 220. The data from the internal sensors located within filter housings as well as external devices can be reviewed, stored, analyzed, etc. by the computer system 250 and/or the mobile device 252. The computer system 250 and the mobile device 252 can also communicate to the external communication device 220 via wireless data signals 224, 226 respectively.

Filter housings, external elements, and their coupling elements of this embodiment are not limited to the above examples, however. Other types of coupling elements of filter housings according to the claims may be used and external elements may be configured to mate with these coupling elements. Further, the mechanical connection provided by the coupling elements to the filter housings and the external devices may be sufficient to physically support the filter housings and the external devices which they connect without the need for a separately provided frame of the like.

FIG. 11A is a view of a filter housing according to another particular embodiment of the present invention. A filter housing 260 may comprise one or more coupling elements comprising an attachment end 264 with a displaceable locking tab 262. The attachment end 264 may be substantially similar to attachment end 26 comprising displaceable locking tab 28 of the embodiment shown in FIG. 2.

In this embodiment, the filter housing 260 may be permanently or releasably connected to an external automated sampling device 300 by bringing the attachment end 264 of filter housing 260 at least partly into a receiving holder 302, which may be substantially similar to the receiving holder 32 of the embodiment shown in FIG. 2, of external automated sampling device 300 until the displaceable locking tab 262 is oriented to at least partly enter the void space of the receiving holder 302 and the displaceable locking tab 262 locks into place with a mechanical connection (particularly being a form-closed or form-fitting and/or force-fitting connection), thereby fixing the positions of the filter housing 260 and the external automated sampling device 300 relative to each other. The connection between the attachment end 264 and the receiving holder 302 also includes a connection between a power cable and/or a data cable (not shown). The power and/or data cable connection can occur as a single connection (such as a USB data/power connection) or as a plurality of data and/or power connections for numerous device attachments with a separate power and/or data cable lines. The external automated sampling device 300 may utilize a programmable device to determine the timing of the sampling, the interval of sampling, and the volume of the sampling into a plurality of sterile bags 304, 306. The external automated sampling device 300 may be connected to the filter capsule prior to sterilization or is sterilized separately and aseptically connected to the filter capsule. The attachment end 262 for attaching to the external automated sampling device 300 can be molded into end caps, a body, filter connectors, or a label ring of the filter housing 260. Alternatively the attachment end 262 can be welded onto the exterior of the filter housing 260 or removably attachable to the filter housing 260.

FIG. 11B is a view of the filter housing 260 attached to the external automated sampling device 300. The attachment end 264 is locked into place or latched with the receiving holder 302' by the displaceable locking tab 262' which holds the filter housing 260 and external device 300 together. In an example, the filter housing 260 and external device 300 connection may also be easily released by displacing the locking tabs 262', for example downward by hand or with a tool or machine, and displacing the filter housing 260 and external device 300 apart. The external automated sampling device 300 collects samples by opening a chamber within a specified (particularly pre-programmed) interval and allows fluid to enter into a sterilized bag assembly. The bags can be individually vented with a filter or vented from a common vent filter located on the external automated sampling device 300. When the metered sample volume has been collected, the sterile bag 306' and the chamber close preventing further filling of the fluid into the bag. The bag can be removed from the assembly for testing the sample by clamping the tubing line and cutting the tubing.

Filter housings, external elements, and their coupling elements of this embodiment are not limited to this example, however. Other types of coupling elements of filter housings according to the claims may be used and external elements may be configured to mate with these coupling elements. Examples of further external elements which may be used include at least one of the following: a communications device, a sampling device, a measuring device, a flow meter, a temperature sensor, a pressure driven device, an orientation sensor, a tilt sensor, an accelerometer, a free-fall sensor, an impact sensor, a vibration or acoustic sensor, a weight sensor or other load bearing sensor, a force gauge, a dosimeter, a metal detector, a motion detector, a dynamic surface tension sensor, a pressure sensor, a concentration sensor, a hygrometer, a conductivity sensor, a viscometer, a rheometer, a chemical sensor, a trace gas sensor, a pH sensor, a light sensor, a luminance sensor, a dissolved oxygen sensor, a carbon dioxide sensor, a glucose sensor, a protein concentration sensor, and/or an assay sensor.

Figures 12A, 12B:
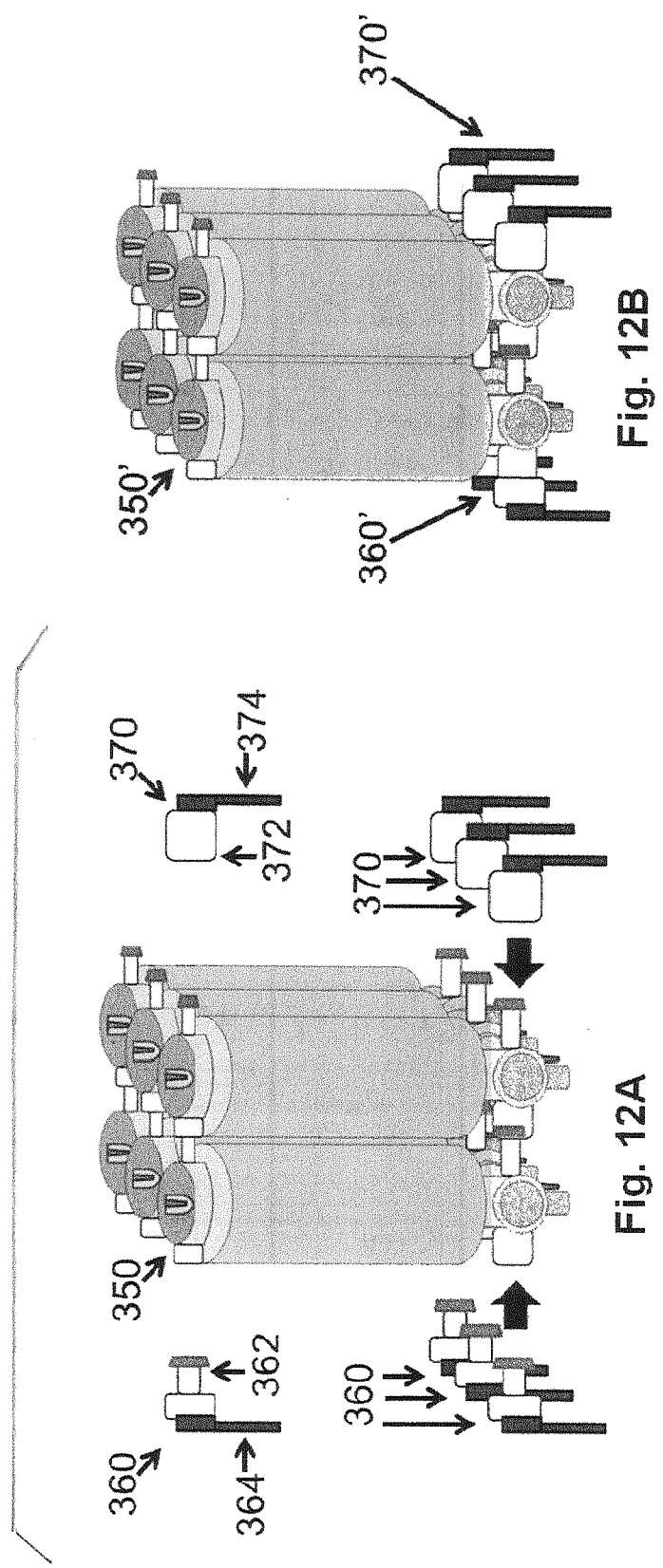
FIGS. 12A and 12B respectively illustrate exploded and assembled views of an embodiment of a filter housing provided with coupling elements that have external holders of a first embodiment, while FIGS. 12C and 12D respectively illustrate exploded and assembled views of an embodiment of a filter housing provided with coupling elements that have external holders of a second embodiment.

FIG. 12A shows a filter housing according to another particular embodiment of the present invention. Filter capsule assembly 350 comprises for example six filter capsules comprising filter housings that are attached using coupling elements as for example a barbed end attachment mechanism which may be substantially similar to the barbed end and receiving holder configuration of the above-described embodiment in FIG. 1. The open barbed ends and receiving holders on sides of the filter housings can be utilized to attach at least one external holder device to keep the capsule assembly off of a surface such as a floor in accordance with good manufacturing practices (GMP). The external holder 360 may comprise a barbed end 362, which may be substantially similar to the barbed ends of the filter housings in the filter capsule assembly 350, and a leg external holder stand 364. The external holder 370 may comprise a receiving holder 372, which may be substantially similar to the receiving holders of the filter housings in the filter capsule assembly 350, and a leg external holder stand 374. The barbed ends and the receiving holders from the filter capsule assemblies 350 may be molded into end caps, a body, filter connectors, or a label ring of the filter housings. Alternatively, the barbed ends and receiving holders can be welded onto the exterior of the filter housings or removably attachable to the filter housings. The external holders 360, 370 may be made of plastic and can be reusable or disposable or they can be made from stainless steel and are reusable after cleaning. The external holders 360, 370 can have hinged, articulating, and/or telescoping legs 364, 374 which can be folded toward, away, or at an angle from the filter housing body. FIG. 12B is a view of a filter capsule assembly 350' with a plurality of external holders 360', 370' containing legs that come into contact with the floor attached to the filter capsule assembly 350' elevating it off the ground, leveling, and balancing it during the filtration process.

Additionally or alternatively, the coupling elements may comprise at least one of hinged, articulating, and telescoping legs which can be folded at least one of toward, away, and at an angle from the external holder(s) and filter housing(s).

The external holders 360, 370 could additionally or alternatively contain tube holders on the leg 364, 374 or other extended portion of the assembly. These tube holders could be utilized to serve as guides or holders for tubing for the proper placement and alignment of tubing for use in single-use assemblies.

FIG. 12C is a view of a filter capsule assembly 352 comprising for example six filter capsules that are attached using a barbed end attachment mechanism which may be substantially similar to the barbed end and receiving holder configuration of the above-described embodiment in FIG. 1. The open barbed ends and receiving holders on either side of the filter capsules can be utilized to attach at least one external holder device to keep the capsule assembly off of a surface such as a floor in accordance with GMP. The external holder 380 may comprise a barbed end 382, which may be substantially similar to the barbed end of the filter housings in the filter capsule assembly 352, and a tripod 384 external holder stand containing a plurality of legs. The external holder 390 may comprise a receiving holder 392, which may be substantially similar to the receiving holders of the filter housings in the filter capsule assembly 352, and a tripod 394 external holder stand comprising a plurality of legs. The external holders can be made of plastic and can be reusable or disposable or they can be made from stainless steel and are reusable after cleaning. FIG. 12D is a view of a filter capsule assembly 352' with a plurality of external holders 380', 390' comprising tripod stands that come into contact with the floor are attached to the filter capsule assembly 352' elevating it off the ground, leveling, and balancing it during the filtration process.

It is to be appreciated that in the foregoing embodiment shown in FIG. 12, it is not necessary to use filter capsules with filter housings that comprise coupling elements comprising barbed ends and receiving holders. It is also possible to use filter capsules with any filter housing according to the claims, as for example described in the above embodiments.

Figure 13C:
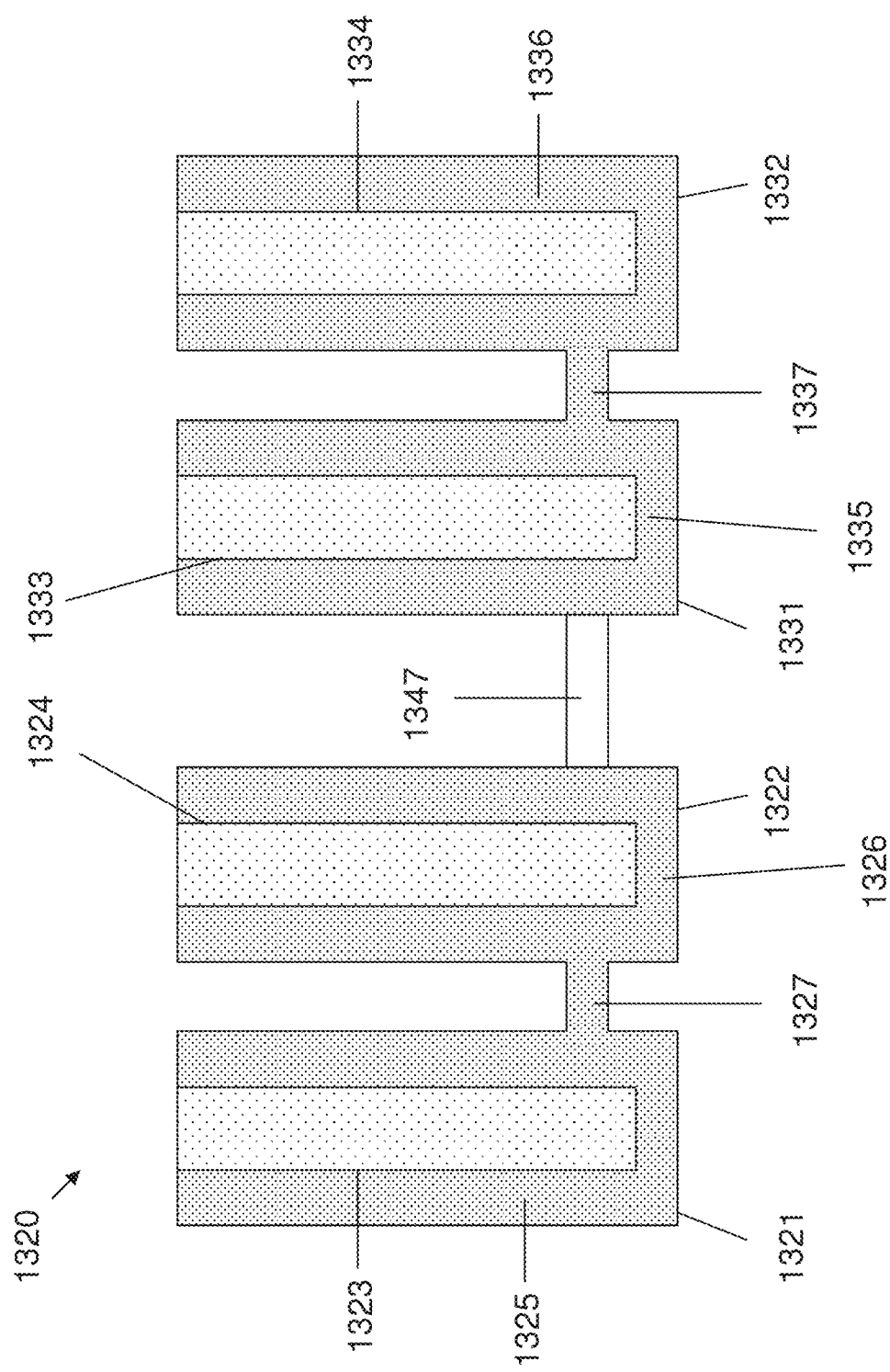

FIGS. 13A-C are schematic diagrams illustrating one or more possible configurations of filter capsules comprising filter housings made possible by aspects of the present invention.

FIG. 13A is a view of a filter capsule assembly 1300 including filter capsules comprising respectively filter housings 1301, 1302 and filters 1303, 1304. Each filter capsule includes also an upstream (i.e. to be filtered) volume 1305, 1306. In this example, filter housings 1301, 1302 are connected to each other indirectly or directly by means of connection 1307 comprised of coupling elements of filter housings according to the present invention. In this configuration, upstream volumes 1305, 1306 are not shared among filter capsules in the filter capsule assembly 1300.

FIG. 13B is a view of a filter capsule assembly 1310 including filter capsules comprising respectively filter housings 1311, 1312 and filters 1313, 1314. Each filter capsule includes also an upstream (i.e. to be filtered) volume 1315, 1316. In this example, filter housings 1311, 1312 are connected to each other indirectly or directly by means of connection 1317 comprised of coupling elements of filter housings according to the present invention. In this configuration, upstream volumes 1315, 1316 are shared among filter capsules in the filter capsule assembly 1310 through a fluid connection allowed by the connection 1317. Connection 1317 may thus be for example a sanitary connection or an aseptic connector assembly according to the present invention, as described in various embodiments above.

FIG. 13C is a view of a filter capsule assembly 1320 including filter capsules comprising respectively filter housings 1321, 1322, 1331, 1332 and filters 1323, 1324, 1333, 1334. Each filter capsule includes also an upstream (i.e. to be filtered) volume 1325, 1326, 1335, 1336. In this example, filter housings 1321, 1322, 1331, 1332 are to be connected to each other indirectly or directly by means of connections 1327, 1337, 1347 comprised of coupling elements of filter housings according to the present invention. In this configuration, upstream volumes 1325, 1326 are shared among only filter capsules including filter housings 1321, 1322 in the filter capsule assembly 1320 through a fluid connection allowed by the connection 1327. Further, upstream volumes 1335, 1336 are shared among only filter capsules including filter housings 1331, 1332 in the filter capsule assembly 1320 through a fluid connection allowed by the connection 1337. Connections 1327, 1337 may thus be for example a sanitary connection or an aseptic connector assembly according to the present invention, as described in various embodiments above. Further in this configuration, the first set of filter housings 1321, 1332 is connected to the second set of filter housings 1331, 1332 by means of connection 1347. In this example, connection 1347 does not share upstream volume between the sets of filter housings. In another example, connection 1347 does share upstream volume between the sets of filter housings, in which case all filter capsules would share upstream volume.

The present invention is not limited to the configurations in FIG. 13. It is to be appreciated by a person skilled in the art that many more configurations are possible with many combinations of connection(s) which allow and connection(s) which do not allow upstream volume to be shared among filter capsules through the filter housings. Accordingly, filter capsule assemblies with filter capsules comprising filter housings according to the present invention allow for easy handling of the filter capsule assembly due to the connections provided by the coupling elements. Various parallel and/or serial configurations of filter capsules comprising filter housings according to one or more aspects of the present invention may allow for better mixing, increased filtration speed, and/or decreased cake layer buildup.

Figure 14:
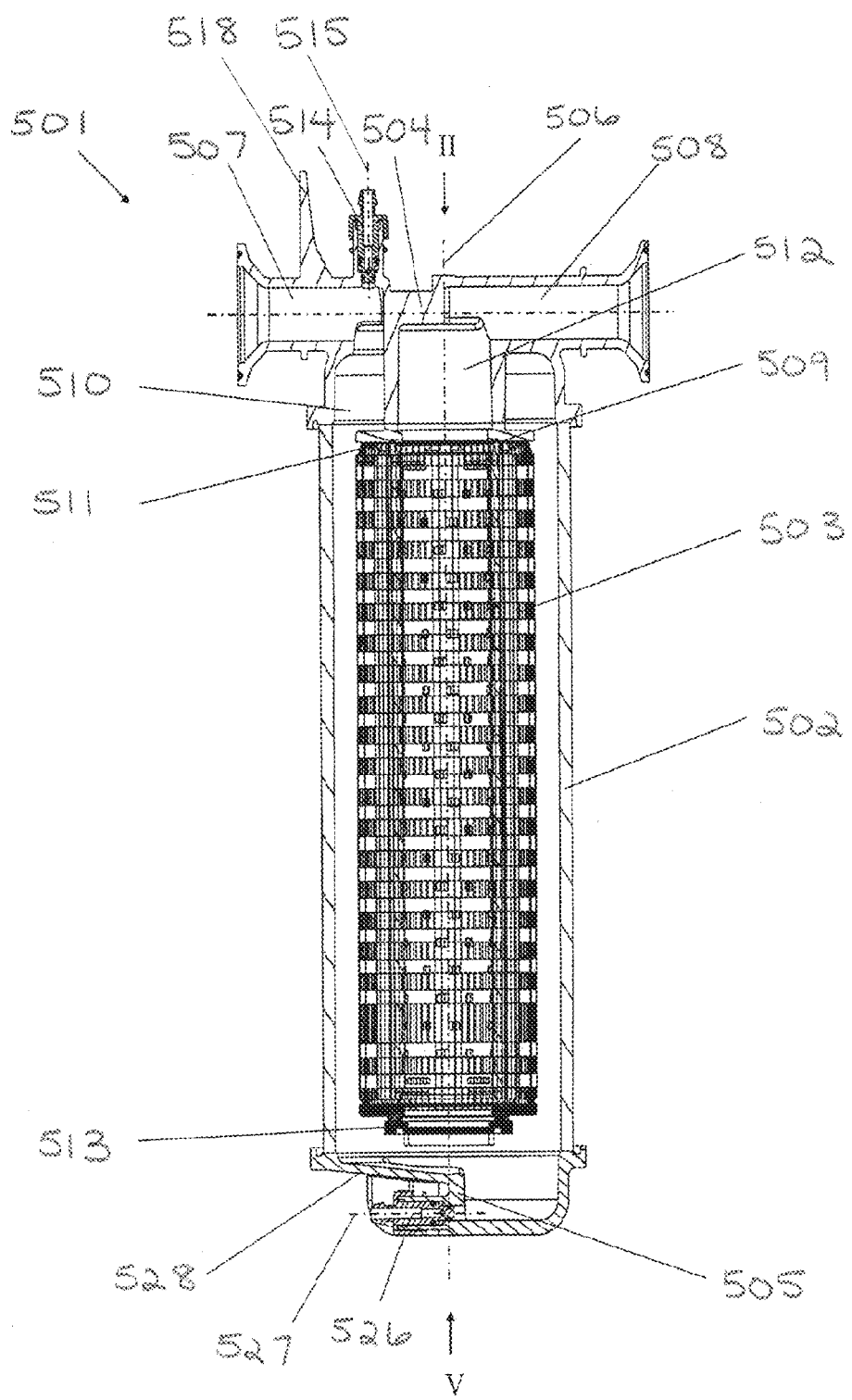
FIG. 14 is a side view, in cross section, of a filter capsule with housing inlet and housing outlet in the T style which may be used in embodiments of the present invention.

An example filter capsule for filtering liquid media which may be used in conjunction with the present invention can be found in U.S. patent application Ser. No. 12/759,885. The filter capsule is identified generally by the numeral 1(I) in FIG. 14. The filter capsule 501 is composed principally of a filter housing 502 with a filter 503, a first end cap 504 and a second end cap 505.

The first end cap 504 has a housing inlet 507 and a housing outlet 508 transverse to the longitudinal axis 506 of the filter housing 501.

The filter 503 is secured with its first end 509 on the first end cap 504, in this example by welding. A non-filtrate chamber 510 is arranged between the filter 503 and the filter housing 502 and is connected to the housing inlet 507. The filter 503 has an inner tube 511 with an interior that forms a filtrate chamber 512, which is connected to the housing outlet 508. The filter housing 502 has a second end directed away from the first end cap 504 and the second end cap 505 is at the second end of the filter housing 502. The filter 503 has a closed, free end 513 arranged at a distance from the second end cap 505.

Figure 15:
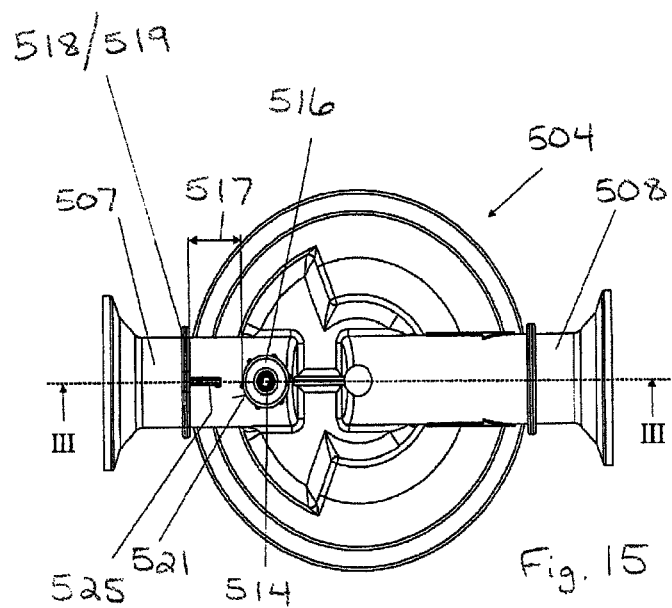
FIG. 15 is a plan view of the filter capsule in FIG. 14 from direction II.
Figure 16:
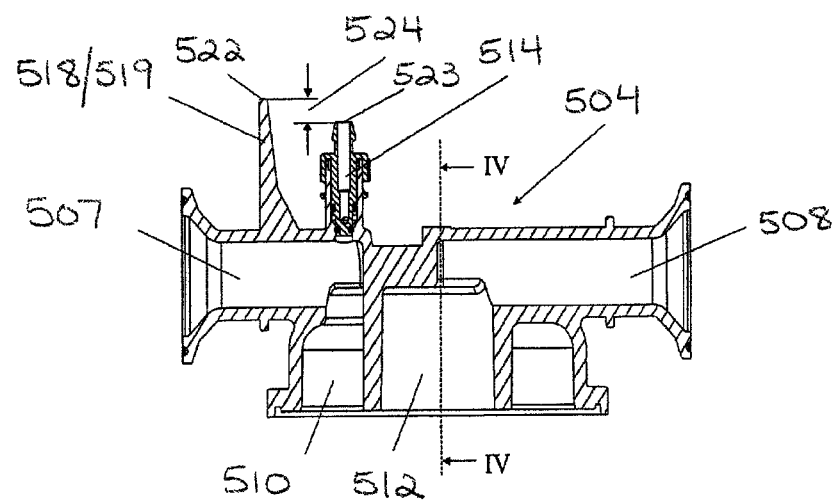
FIG. 16 shows a side view of the first end cap from FIG. 15, in section along line III-III.
Figure 17:
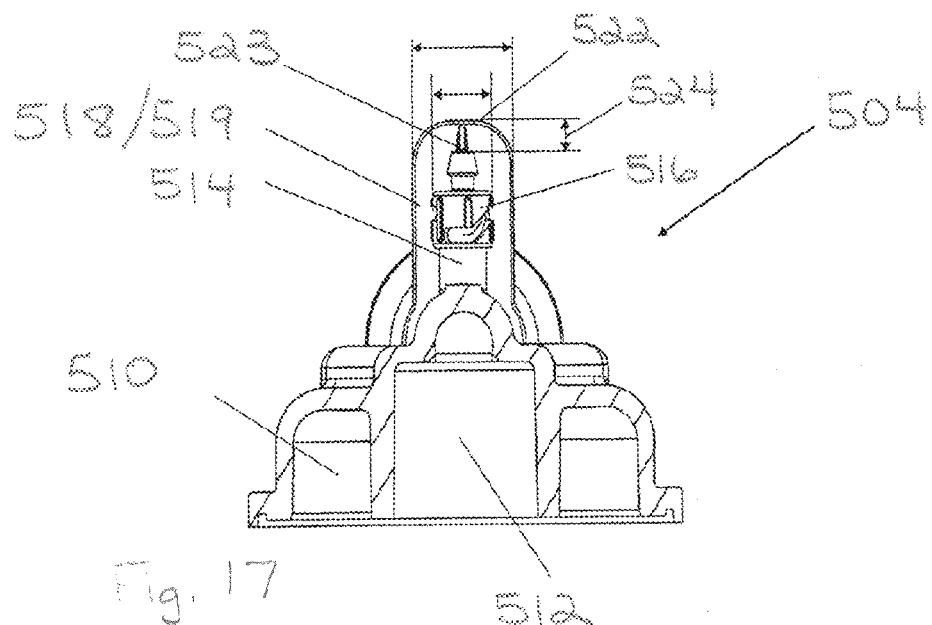
FIG. 17 shows a side view of the first end cap from FIG. 16, in section along line IV-IV.

The first end cap 504 has an air release valve 514 with a longitudinal axis 515 that extends approximately parallel to the longitudinal axis 506 of the filter housing 502. The air release valve 514 is connected to the non-filtrate chamber 510, or connected via the housing inlet 507 to the non-filtrate chamber 510. The air release valve 514 can be opened and closed in a manner known per se by turning a closure part 516 of the air release valve 514, as shown in FIGS. 15 and 16. A protective wall 518 is arranged on the first end cap 504 at a distance 517 from the air release valve 514 and defines a protective tongue 519 directed away from the first end cap 504. The protective tongue 519 is arranged approximately parallel to the longitudinal axis 506 of the filter housing 502 and has a tongue width that is greater than the external diameter 521 of the air release valve 514, as shown in FIG. 15. The free end 522 of the protective tongue 519 protrudes beyond the free end 523 of the air release valve 514 by a distance 524, as shown in FIG. 16. The protective tongue 519 has a stabilizing rib 525 toward the first end cap 504, as shown in FIG. 15.

Figure 18:
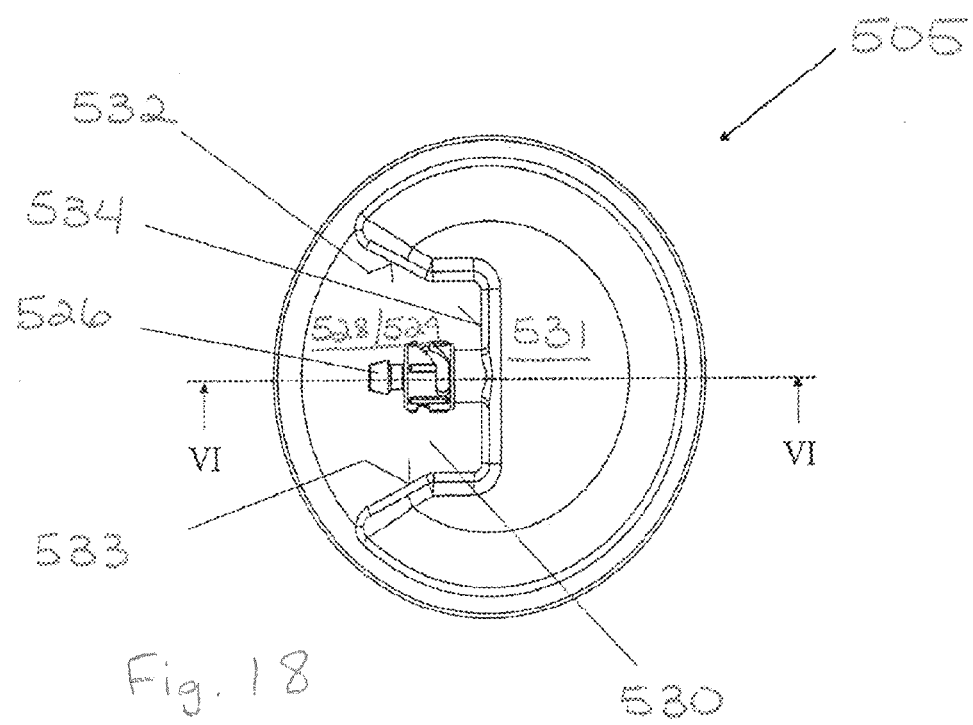
FIG. 18 shows a bottom view of the second end cap in FIG. 14 from direction V.
Figure 19:
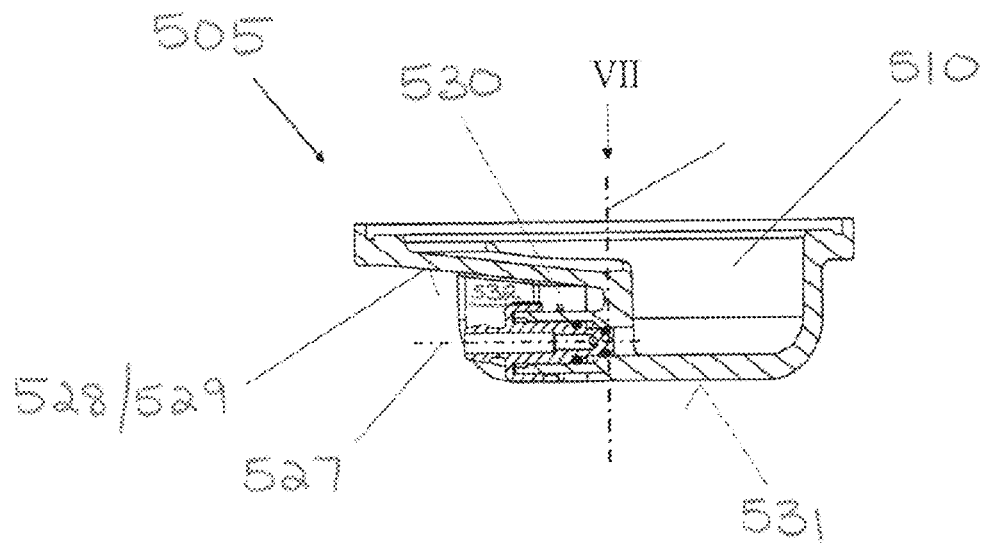
FIG. 19 shows a side view of the second end cap from FIG. 18 along the line VI-VI.
Figure 20:
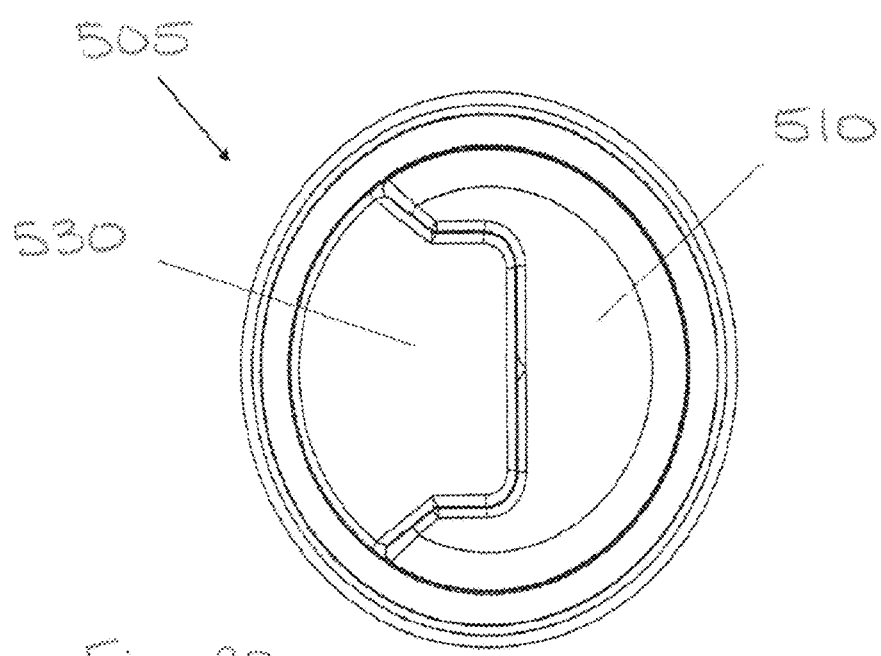
FIG. 20 shows a plan view of the second end cap in FIG. 19 from direction VII.

The second end cap 505 is arranged at the lower end of the filter housing 502 in the vertical direction and has an air release valve 526 with a longitudinal axis 527 arranged transverse to the longitudinal axis 506 of the filter housing 502. A protective wall 528 is arranged on the second end cap 505 at a distance from the air release valve 526 and also is transverse to the longitudinal axis 506 of the filter housing 502. The protective wall 528 forms the bottom 529 of a radially arranged recess 530 of the end face 531 of the second end cap 505, as shown in FIGS. 18 through 20. The recess 530 is open toward the outer circumference of the end cap 505 and is delimited by two mutually opposite side walls 532, 533 and by a base wall 534 that connects the side walls 532, 533, as shown in FIG. 18. The base wall 534 carries the air release valve 526, which is connected to the non-filtrate chamber 510. The side walls 532, 533 and the base wall 534 are arranged approximately perpendicular to the protective wall 528 or to the bottom 529.

The filter housing 502, the end caps 504, 505 with the air release valves 514, 526, and the filter 503 are made of plastic. In particular, the end caps 504, 505 are produced by injection molding. The first end 509 of the filter 503 is welded to the first end cap 504. The end caps 504, 505 in turn are welded to the filter housing 502.

A medium that is to be filtered is fed via the housing inlet 507 to the non-filtrate chamber 510, is filtered by the filter 503, and is removed via the filtrate chamber 512 and the housing outlet 508. If the first end cap 504 with the housing inlet 507 and the housing outlet 508 is arranged at the top in the vertical direction, air is removed if necessary from the non-filtrate chamber 510 via the air release valve 514.

If the first end cap 504 with the housing inlet 507 and the housing outlet 508 is arranged at the bottom in the vertical direction, air is removed from the non-filtrate chamber 510 via the air release valve 526 of the second end cap 505.

The present invention is not limited to the above filter capsule, however. As one skilled in the art will appreciate, the preceding description of filter housings according to the present invention may be applied to a filter capsule of any configuration provided that it comprises a filter housing, a filter capsule, or methods in accordance with the claims.

In certain embodiments, it may be desired to form more than two coupling elements on a single filter housing for example in order to connect filter capsules in a star configuration.

In certain embodiments, it may be desired to form coupling elements which are not complementary on a single housing. For example, if a filter capsule assembly including filter housings with coupling elements as barbed ends and receiving holders is to be connected with a filter capsule assembly including filter housings with coupling elements as fasteners, it may be appropriate to provide a connecting filter housing which is formed with one of a barbed end and a receiving holder on one portion of the filter housing and a fastener on another portion of the filter housing so that the filter capsule assemblies can be connected. It is further possible to indirectly connect the filter capsule assemblies with an external adapter connector which in this example would be on one end provided with one of a barbed end and a receiving holder and on the other end a fastener to complement the coupling elements of the filter housings to be connected.

In certain embodiments, it may be desired to provide the filters with a shared upstream volume by linking filter housings of filter capsules together. This will allow for more efficient processing of filtered material since the shared fluid flow will move to filters that are less plugged allowing for higher flow rates at reduced differential pressures when compared to a similar setup with separated individual capsules. The shared upstream volume with an aseptic connector assembly according to an aspect of the present invention allows an operator to add filtration area or capacity easily while filtration is in progress. The premature plugging of a filtration assembly can occur due to batch-to-batch variation within a process. A filter capsule with a cap on the upstream side, an aseptic connector assembly to the upstream side on the filter housing of an adjoining filter capsule and an aseptic connector assembly to a downstream manifold will allow for additional filtration area or capacity to be added into a system if premature plugging is observed during the filtration process. The aseptic connector assembly of the filter housing of a new capsule is attached to the side of a filter housing of a filter capsule already in use with the filtration process. The new capsule has a downstream aseptic connector assembly which is attached to a downstream manifold for collecting the filtrate. The valves for the aseptic connector assembly between the two filters is opened and fluid flows into the upstream volume of the new capsule allowing for an easy bypass to add additional filtration area to a system.

Additionally or alternatively, a filter capsule can be connected to the filtration setup via an aseptic connector assembly and contain a pressure controlled valve which opens up after the upstream volume reaches a certain pressure. This opens the valve and the filter of the additional filter capsule can begin to process the fluid available within the upstream volume. This action will prevent filtration processing to lose valuable product when the operator is not able to manually operate a valve to add additional filtration area to a process while that process is in progress.

The preceding description has been presented with reference to various embodiments of the present invention. One skilled in the art to which the present invention pertains will appreciate that alterations in the described structures and methods of operation can be practiced without meaningfully departing from the spirit and scope of the invention.

What is claimed is:

1. A filter housing assembly comprising: at least first and second filter housings, each of which has an accommodation space for at least partly accommodating a filter, each of the filter housings having first and second coupling elements formed integrally on a portion of the respective filter housing, the second coupling element of the first filter housing being configured to mate directly with the first coupling element of the second filter housing to form the filter housing assembly, the second coupling element of the first filter housing and the first coupling element of the second filter housing being configured to provide an electrical connection for at least one of receiving, transmitting, and carrying at least one of communication, power, and electrical signals between the first and second filter housings, the second coupling element of the second filter housing being configured for connection to either an external communication device or to a first coupling element of a further filter housing of the filter housing assembly.

2. The filter housing according to claim 1, wherein each of the coupling elements is at least one of molded and welded on at least one of an end cap, a body, a filter connector, and a label ring of the filter housing.

3. The filter housing according to claim 1, wherein the second coupling element of the first filter housing and the first coupling element of the second filter housing are formed respectively as male and female coupling elements configured for mating with one another.

4. The filter housing according to claim 1, wherein the second coupling element of the first filter housing comprises a barbed end and the first coupling element of the second filter housing comprises a receiving holder for receiving the barbed end.

5. The filter housing according to claim 1, wherein the second coupling element of the first filter housing includes an attachment end with a displaceable locking tab configured to at least partly enter a void space of a fitted receiving holder of the first coupling element of the second filter housing and lock a connection between the first filter housing and the second filter housing.

6. The filter housing according to claim 5, wherein the displaceable locking tab is further configured to be operable to remove the connection between the first filter housing and the second filter housing by detaching the attachment end from the fitted receiving holder.

7. The filter housing according to claim 1, wherein the coupling elements comprise a fastener which is at least one of hook and loop fasteners, mushroom shaped fasteners, woven fasteners, and magnets.

8. The filter housing according to claim 1, wherein the coupling elements comprise a reinforced attachment section comprised of an insertion slot and at least one internal locking tab, wherein the reinforced attachment section is configured to receive an external locking piece insertable into the insertion slot, wherein the external locking piece is held into place with the internal locking tab.

9. The filter housing according to claim 1, wherein the second coupling element of the first filter housing comprises an attachment end being resiliently deformable which is configured to attach to a receiving holder of the first coupling element of the second filter housing.

10. The filter housing according to claim 1, wherein the second coupling element of the first filter housing comprises a receiving holder configured to attach to an interconnection member which is further configured to attach to a mating receiving holder of the first coupling element of the second filter housing.

11. The filter housing according to claim 1, wherein the first coupling element of the first filter housing is configured for attaching at least one external device.

12. The filter housing of claim 11, wherein the external device is a power device that is connected to the first filter housing using the first coupling element, wherein the power device includes at least one of: a rechargeable battery, a power cord or other wired connection, a powered communication port, a solar cell, a mechanical power source, an electromechanical power source such as a hand crank, and a wireless power source.

13. The filter housing of claim 11, wherein the external device includes at least one of: a communications device, a sampling device, a measuring device, a flow meter, a temperature sensor, a pressure driven device, an orientation sensor, a tilt sensor, an accelerometer, a free-fall sensor, an impact sensor, a vibration or acoustic sensor, a weight sensor or other load bearing sensor, a force gauge, a dosimeter, a metal detector, a motion detector, a dynamic surface tension sensor, a pressure sensor, a concentration sensor, a hygrometer, a conductivity sensor, a viscometer, a rheometer, a chemical sensor, a trace gas sensor, a pH sensor, a light sensor, a luminance sensor, a dissolved oxygen sensor, a carbon dioxide sensor, a glucose sensor, a protein concentration sensor, and an assay sensor.

14. The filter housing according to claim 1, wherein at least one of the coupling element is configured to attach the filter housing to a holder mechanism comprising at least one of a plurality of legs and tripods.

15. The filter housing according to claim 14, wherein the holder mechanism is configured with a plurality of at least one of tube holders, holes, notches, and guides for the proper placement and alignment of at least one of tubing, manifolds, cables, and electronic equipment.

16. The filter housing according to claim 14, wherein at least one of the coupling elements and holding mechanism is molded and/or color coded to attach only to a correct coupling element of a correct filter housing.

17. The filter housing according to claim 1, wherein at least one coupling element of each filter housing comprises a visual, electronic, and/or audible confirmation of a connection provided to an operator, a machine, or a monitoring device.

18. The filter housing according to claim 17, wherein the confirmation includes at least one of: a plurality of changes including a visual change in color, a change in shape, an alignment of pictographs, symbols or lettering, an LED light, an infrared LED light, an alignment of at least two separated augmented reality marker parts to form a completed whole, a proximity of at least two static augmented reality marker, or a variable augmented reality marker; an electronic change in an RFID or NFC presentation, and an audible confirmation including at least one of a mechanical click sound when components are mated and a digital or analog sound including a chime or spoken voice from a speaker.

19. A filter capsule comprising the filter housing of claim 1.

20. A method of forming a filter housing assembly comprising the steps of:
providing a plurality of filter housings each with an accommodation space for at least partly accommodating a filter,
integrally forming on a portion of each of the filter housings first and second coupling elements,
mating the first coupling element of a first of the filter housings of the plurality of filter housings with the second coupling element of a second of the filter housings of the plurality of filter housings for attaching the first and second filter housings and forming at least a part of the filter housing assembly, wherein each of the coupling elements is configured to provide an electrical connection for at least one of receiving, transmitting, and carrying at least one of communication, power, and electrical signals, and wherein the step of mating the first coupling element of the first filter housing of the plurality of filter housings with the second coupling element of the second filter housing of the plurality of filter housings comprises providing an electrical connection for at least one of receiving, transmitting, and carrying at least one of communication, power, and electrical signals.

* * * * *